United States Patent
El Mahdawy et al.

(10) Patent No.: US 12,542,707 B2
(45) Date of Patent: Feb. 3, 2026

(54) FACILITATING INTELLIGENT CONCEPT DRIFT MITIGATION IN ADVANCED COMMUNICATION NETWORKS

(71) Applicant: Dell Products, L.P., Round Rock, TX (US)

(72) Inventors: Ahmed El Mahdawy, Ap Cairo (EG); Karim Walid, Egypt (EG); Omar Wael Ahmed Ahmed Gad, Cambridge (GB); Marwan Mansour, Alexandria (EG)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 18/584,018

(22) Filed: Feb. 22, 2024

(65) Prior Publication Data

US 2025/0274339 A1    Aug. 28, 2025

(51) Int. Cl.
*H04L 41/0663* (2022.01)
*H04L 41/16* (2022.01)

(52) U.S. Cl.
CPC .......... *H04L 41/0663* (2013.01); *H04L 41/16* (2013.01)

(58) Field of Classification Search
CPC ............................ H04L 41/0663; H04L 41/16
USPC ........................................................ 709/224
See application file for complete search history.

(56) References Cited

U.S. PATENT DOCUMENTS

| | | | | |
|---|---|---|---|---|
| 8,533,224 B2 * | 9/2013 | Lin | ........................ | G06N 20/00 707/777 |
| 10,209,974 B1 * | 2/2019 | Patton | ........................ | G06F 8/60 |
| 11,720,813 B2 * | 8/2023 | Babu | ........................ | G06N 20/20 706/12 |
| 11,720,820 B2 * | 8/2023 | Tokunaga | ........................ | G06N 20/00 706/12 |
| 11,977,847 B2 * | 5/2024 | Szanto | ........................ | G06F 40/30 |
| 12,210,949 B1 * | 1/2025 | Silver | ........................ | G06N 20/20 |
| 2016/0342903 A1 * | 11/2016 | Shumpert | ........................ | G06F 11/008 |
| 2017/0109646 A1 * | 4/2017 | David | ........................ | G03F 7/70625 |
| 2020/0192306 A1 * | 6/2020 | Virani | ........................ | G05B 13/0275 |
| 2020/0279200 A1 * | 9/2020 | Makhija | ........................ | G06N 3/049 |
| 2021/0224696 A1 * | 7/2021 | Nasr-Azadani | ........................ | G06N 5/01 |
| 2021/0390466 A1 * | 12/2021 | Varadarajan | ........................ | G06N 5/043 |
| 2022/0164662 A1 * | 5/2022 | Saki | ........................ | G10L 15/20 |

(Continued)

*Primary Examiner* — Karen C Tang
(74) *Attorney, Agent, or Firm* — Amin, Turocy & Watson, LLP

(57) ABSTRACT

Facilitating intelligent concept drift mitigation in advanced communication networks is provided herein. A method includes utilizing, by a system comprising a processor, a first model that facilitates management of resources within a communications network. A reliability level of the first model is determined to satisfy a defined reliability level. The method also includes based on a first determination that the reliability level of the first model no longer satisfies the defined reliability level, replacing, by the system, the first model with a second model that temporarily facilitates management of the resources within the communications network. Further, the method includes, based on a second determination that a third model satisfies the defined reliability level, deploying, by the system, the third model within the communications network. The deploying can include incrementally transitioning facilitation of the management of resources from the second model to the third model.

20 Claims, 20 Drawing Sheets

(56) References Cited

U.S. PATENT DOCUMENTS

| | | |
|---|---|---|
| 2022/0165292 A1* | 5/2022 | Saki ................ G06N 20/00 |
| 2022/0215297 A1* | 7/2022 | Narita .............. G06V 10/98 |
| 2023/0093130 A1* | 3/2023 | Fenoglio ......... G06F 18/2433 |
| | | 709/224 |
| 2023/0281472 A1* | 9/2023 | Asghari ............ G06N 20/20 |
| | | 706/12 |
| 2024/0202783 A1* | 6/2024 | Pat ................. G06F 18/2321 |
| 2024/0249164 A1* | 7/2024 | Ezrielev ............. G06N 5/04 |
| 2024/0281661 A1* | 8/2024 | Gottin .............. G06N 3/088 |
| 2024/0320267 A1* | 9/2024 | Sriharsha ......... G06F 16/242 |
| 2024/0320509 A1* | 9/2024 | Väänänen ......... G06N 20/00 |
| 2025/0021257 A1* | 1/2025 | Sethi ................ G06F 3/065 |
| 2025/0036396 A1* | 1/2025 | Rumade ............ G06F 8/34 |
| 2025/0036982 A1* | 1/2025 | Bishof ............. G06N 20/00 |
| 2025/0068157 A1* | 2/2025 | Shin ............... G05B 23/024 |
| 2025/0068974 A1* | 2/2025 | Richards .......... G06N 20/00 |
| 2025/0077949 A1* | 3/2025 | Ponnalagu ........ G06N 20/00 |
| 2025/0077959 A1* | 3/2025 | Yan ................. G06N 3/045 |

* cited by examiner

FACILITATING INTELLIGENT CONCEPT DRIFT MITIGATION IN ADVANCED COMMUNICATION NETWORKS

BACKGROUND

Machine Learning (ML) models deployed on a Radio Access Network (RAN) are deployed statically and do not continuously adapt to changes in network conditions, which leads to concept drift. Concept drift can cause several problems including decreased network capacity, decreased quality of service, rejection of incoming control messages, and service delays. Accordingly, unique challenges exist related to network efficiency and in view of forthcoming Fifth Generation (5G), new radio (NR), Sixth Generation (6G), or other next generation, standards for network communication.

The above-described context with respect to communication networks is merely intended to provide an overview of current technology and is not intended to be exhaustive. Other contextual descriptions, and corresponding benefits of some of the various non-limiting embodiments described herein, will become further apparent upon review of the following detailed description.

SUMMARY

The following presents a simplified summary of the disclosed subject matter to provide a basic understanding of some example embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An embodiment relates to a method that includes utilizing, by a system comprising a processor, a first model that facilitates management of resources within a communications network. A reliability level of the first model is determined to satisfy a defined reliability level. The method also includes, based on a first determination that the reliability level of the first model no longer satisfies the defined reliability level, replacing, by the system, the first model with a second model that temporarily facilitates management of the resources within the communications network. Further, the method includes, based on a second determination that a third model satisfies the defined reliability level, deploying, by the system, the third model within the communications network. The deploying can include incrementally transitioning facilitation of the management of resources from the second model to the third model.

According to some implementations, the method can include prior to the replacing, determining, by the system, that a network environment or a network deployment has changed. Further to these implementations, the method can include evaluating, by the system, the reliability level of the first model based on the network environment or the network deployment.

In some implementations, the incrementally transitioning can include deploying the third model to route a first defined amount of requests within the communications network. The deploying can include discontinuing routing of the first defined amount of requests to the second model. Further, the incrementally transitioning can include, at defined intervals, increasing the first defined amount of requests to a second defined amount of requests routed to the third model and, at substantially a same time or concurrently, discontinuing a routing of the second defined amount of requests to the second model. Further to these implementations, the method can include, during the deploying or the increasing and based on detecting that the third model fails to satisfy the defined reliability level, resuming, by the system, routing of requests to the second model. The method can also include discontinuing, by the system, use of the third model, wherein the resuming and the discontinuing occur at about a same time or concurrently.

The method can include, according to some implementations, prior to the deploying, retraining, by the system, the first model on a set of current network data associated with the communications network. The first model can be retrained to facilitate the management of the resources to a defined confidence level.

In accordance with some implementations, the method can include, prior to the deploying, evaluating, by the system, a group of models stored in a data structure. The evaluating can be based on a current environment within the communications network and respective parameters of models of the group of models. The method can also include selecting, by the system, the third model from the group of models based on the third model being determined to satisfy the defined reliability level and determined to be suitable for reuse in the communications network. Further to these implementations, the evaluating can include cross-referencing models in the data structure with live data occurring within the communications network. Further, the selecting can include selecting the third model based on data of the third model being determined to match the live data.

In some implementations, the first model is a tree-based model, and the second model is a neural network model. According to some implementations, the first model is a linear model, and the second model is a neural network model.

Another embodiment relates to a system that includes a processor and a memory that stores executable instructions that, when executed by the processor, facilitate performance of operations. The operations can include, based on changes within an environment of a communication network determined to have caused a currently deployed model to be ineffective for management of resources within the communication network, according to an efficacy criterion: activating a robust model for a temporary management of the resources. Further operations can include performing one of: retraining the currently deployed model on data associated with the changes within the environment, resulting in a retrained model or selecting an existing model from a group of existing models based on trained data of the existing model being determined to match the data associated with the changes within the environment, resulting in a selected existing model. The operations can also include transitioning a management of the resources from the robust model to the retrained model or to the selected existing model.

According to some implementations, the activating can include routing requests within the communication network to the robust model. The robust model facilitates management of the requests.

The transitioning can include, at substantially a first time: discontinuing use of the robust model for a first defined percentage of the requests and implementing use of the retrained model or the selected existing model for the first defined percentage of the requests. Further, after a defined time interval and at substantially a second time after the first time: discontinuing use of the robust model for a second defined percentage of requests and implementing use of the retrained model or the selected existing model for the second defined percentage of requests.

In some implementations, the activating can include routing requests within the communication network to the robust model. The operations can further comprise controlling a speed at which a percentage of requests are transitioned from the robust model to the retrained model or the selected existing model. Further to these implementations, the controlling can include configuring a total data size for routing of requests to the retrained model or the selected existing model during the retraining or the selecting Yet another embodiment relates to a non-transitory machine-readable medium, comprising executable instructions that, when executed by a processor of network equipment, facilitate performance of operations. The operations can include utilizing a first model to route requests within a communications network, wherein a reliability level of the first model is determined to satisfy a defined reliability level. The operations can also include, based on a first determination that the reliability level of the first model no longer satisfies the defined reliability level, replacing the first model with a second model that temporarily facilitates routing of the requests within the communications network. Further, the operations can include, based on a second determination that a third model satisfies the defined reliability level, deploying the third model within the communications network, wherein the deploying comprises incrementally transitioning routing of the requests from the second model to the third model.

In some implementations, the deploying can include at substantially a same time: rerouting a first percentage of requests from the second model to the third model and, after a defined period of time, increasing the first percentage of requests to a second percentage of requests being rerouted from the second model to the third model until all (or nearly are, or more than a defined amount of) requests have been rerouted to the third model. In accordance with some implementations, a speed of the rerouting from the second model to the third model is configured, during a model evaluation phase, as a total data size for the routing to the third model.

To the accomplishment of the foregoing and related ends, the disclosed subject matter includes one or more of the features hereinafter more fully described. The following description and the annexed drawings set forth in detail certain illustrative embodiments of the subject matter. However, these example embodiments are indicative of but a few of the various ways in which the principles of the subject matter can be employed. Other embodiments, advantages, and novel features of the disclosed subject matter will become apparent from the following detailed description when considered in conjunction with the drawings. It will also be appreciated that the detailed description can include additional or alternative embodiments beyond those described in this summary.

BRIEF DESCRIPTION OF THE DRAWINGS

Various non-limiting embodiments are further described with reference to the accompanying drawings in which.

DETAILED DESCRIPTION

Figure 1:
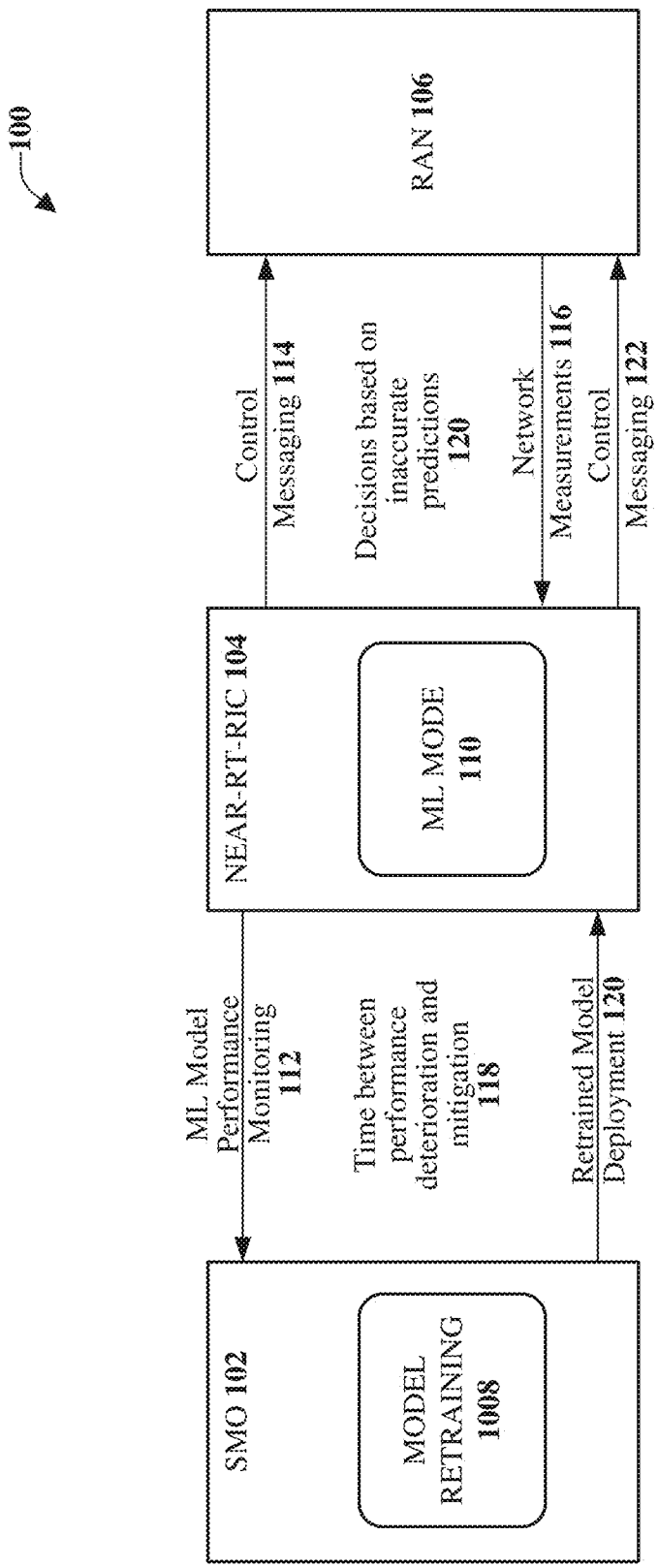
FIG. 1 illustrates an example schematic representation of conventional concept drift mitigation in a telecommunications system.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details. In other instances, well-known structures and devices are shown in block diagram form in order to facilitate describing the various embodiments.

In Machine Learning (ML) technology and its associated ML models, concept drift is a challenge. Concept drift occurs when the data distribution in production becomes different than the data used for training. This leads to the ML model's inability to apply its learned representation correctly onto the inference data.

Conventionally, retraining the ML models on up-to-date and relevant data can be utilized to fix the problem. However, in telecommunication use-cases, the time required to retrain a model and redeploy the model will likely lead to the model making inaccurate predictions that may in turn harm the communication network by making irrelevant decisions. Therefore, to enable large-scale and sustainable application of ML in disaggregated architectures or disaggregated approaches, such as an Open Radio Access Network (O-RAN), for example. Accordingly, provided herein are embodiments to mitigate such negative effects associated with concept drift.

It is noted that for purposes of explanation, an O-RAN framework will be discussed. However, the disclosed embodiments are not limited to an O-RAN framework implementation and, instead, other types of disaggregated architecture can be utilized with the various embodiments discussed herein. Further, as it relates to the O-RAN framework, the network equipment can include, but is not limited to, O-RAN Radio Units (O-RUs) and Random Access Network Intelligent Controllers (RICs). Further, the network automation tools include, but are not limited to, an rApp and an xApp.

ML models used in O-RAN are mostly regression models for prediction of quantifiable measurements (e.g., Key Performance Indicator (KPI) prediction), or unsupervised models for clustering and/or anomaly detection. The range of data in a network is huge, making it difficult for one ML model to perform well on the entire range. Instead, models are trained for specific patterns (e.g., Urban Dense networks, specific cell sites data, and so on).

Generally, some models can perform better than others given the data conditions, size, and other factors. While other models, such as neural networks, will learn a representation and are better at scaling the predictions up and down. This concept is utilized with the disclosed embodiments to deploy more robust models when concept drift is detected, until the primary ML models are retrained on the latest data.

In further detail, ML models deployed on the RAN network are deployed statically and do not continuously adapt to changes in network conditions, leading to concept drift. Conventionally, concept drift can be mitigated by triggering retraining of the ML model once the performance deteriorates by a preset offset.

In O-RAN use cases where the ML model is embedded in decision making xApps, the time discrepancy between detecting concept drift and deploying the retrained model can cause harmful decisions being made by a given xApp. Such decisions may subsequently lead to various conditions including, but not limited to, decreased network capacity, decreased Quality of Service (QoS), and/or RAN Intelligent Controller (RIC) control message rejections. The decreased QoS can be encountered if the xApp involves traffic steering or admission control. RIC control message rejection can occur due to the Centralized Unit (CU) and/or the Distributed Unit (DU) having the capability to reject incoming control messages. Although this is a safety measure and can potentially protect the network, the wait time at the CU and/or the DU only to reject the control message can cause service delay.

Therefore, in O-RAN use-cases, as provided herein, the model retraining process due to concept drift involves a backup procedure to minimize the risk of decisions made in near-real time. Accordingly, the disclosed embodiments can be employed to mitigate the above noted issues, as well as other issues.

It should be noted that terms such as "real-time," "near real-time," "dynamically," "instantaneous," "continuously," and the like can refer to data which is collected and processed at an order without perceivable delay for a given context, the timeliness of data or information that has been delayed only by the time required for electronic communication, actual or near actual time during which a process or event occur, and temporally present conditions as measured by real-time software, real-time systems, and/or high-performance computing systems. Real-time software and/or performance can be employed via synchronous or non-synchronous programming languages, real-time operating systems, and real-time networks, each of which provide frameworks on which to build a real-time software application. A real-time system may be one where its application can be considered (within context) to be a main priority. In a real-time process, the analyzed (input) and generated (output) samples can be processed (or generated) continuously at the same time (or near the same time) it takes to input and output the same set of samples independent of any processing delay.

Conventional solutions can be split into two groups: concept drift mitigation as a machine learning problem, and concept drift mitigation in time-critical use-cases. As it relates to concept drift mitigation in ML, concept drift is tackled in ML by triggering retraining of the model on more relevant data. This solution can usually improve the model's performance. Therefore, as an ML problem the solution is satisfactory. As it relates to concept drift mitigation in time-critical use-cases, the time taken for retraining, especially for heavy ML models, poses a risk for the system behavior. Conventionally, there is no process in place in O-RAN framework to mitigate this, and this leads to the problems mentioned in the above problem statement.

In further detail, FIG. 1 illustrates an example schematic representation of conventional concept drift mitigation in a telecommunications system 100. Included in the telecommunications system 100 is a Service Management and Orchestration (SMO) platform (SMO 102), a near rear-time RIC (Near-RT-RIC 104) and a RAN 106. Model retraining 108 is performed by the SMO 102 and the ML model 110 is implemented by the Near-RT-RIC 104.

ML model performance monitoring 112 occurs based on information communicated from the Near-RT-RIC 104 and the SMO 102. Further, the Near-RT-RIC 104 sends control messaging 114 to the RAN for implementation at the RAN 106 based on the ML model 110. Over time, there can be a change between the data distribution in production (e.g., at the RAN 106) and the data used for training (e.g., at the model retraining 108), which is determined based on one or more network measurements 116. Accordingly, there is a delay in the time between performance deterioration and mitigation of the concept drift, as indicated at 118. During the delay, decisions are made based on inaccurate predictions, as indicated at 120. Upon or after the model is retrained (e.g., via the model retraining 108), the retrained model is deployed 120. Controlling messaging 122 is sent from the Near-RT-RIC 104 to the RAN 106 based on the retained model.

Accordingly, as illustrated in FIG. 1, the time that is consumed while the model retraining is performed on the SMO 102 (e.g., while the model is being actively retrained) represents the time between the performance deterioration and the mitigation. That is the risk being addressed with the embodiments provided herein. This deterioration can propagate eventually to the entire network because of inaccurate predictions and decisions being made and affecting the entire network.

Figure 2:
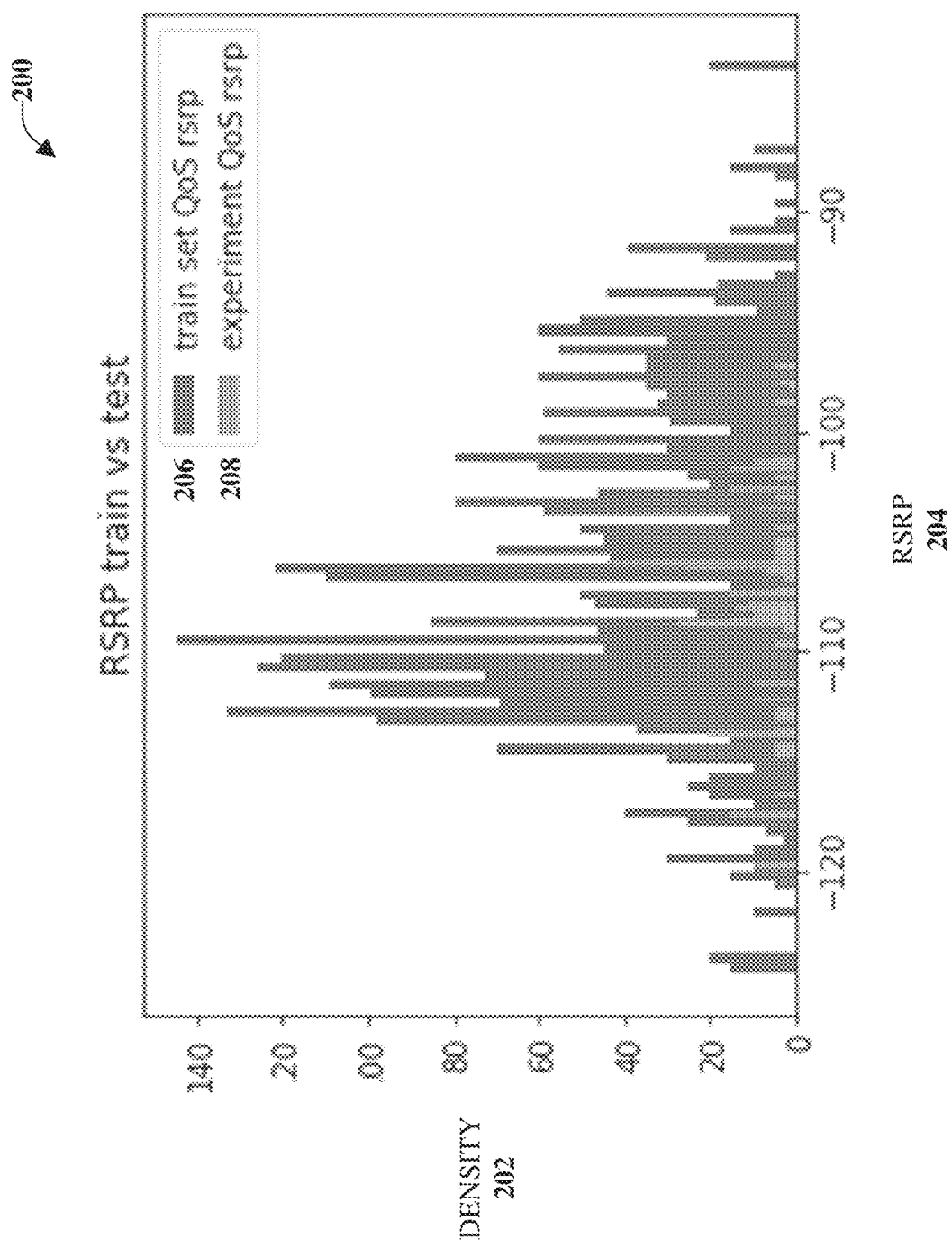
FIG. 2 is graph that illustrates an example of concept drift between training and testing data.

FIG. 2 is graph 200 that illustrates an example of concept drift between training and testing data. Illustrated on the vertical axis (y-axis) is density 202 and illustrated on the horizontal axis (x-axis) is Reference Signal Received Power (RSRP) 204. The darker data points represent the trained set QoS RSRP 206, and the lighter data points represent experiment QoS RSRP 208.

Accordingly, there is harm or damage caused by concept drift in general. However, there is also damage caused by not addressing concept drift in a timely manner. That is the time when the model is being actively retrained. Such harmful decisions that are resulting can lead to decreased network capacity, worse QoS for the existing users (e.g., user equipment UEs) in the network. The harmful decisions can also affect the applications decisions that are given to the nodes on the network, since, for example, the nodes on the network (e.g., the CU and the DU) do have the capability to reject incoming messages. Accordingly, they are considered recommendations and if these recommendations include some rules that are enforced on these nodes, these control messages will be rejected. Thus, a risk being taken is that the algorithms (or processes) and control messages will get rejected.

Embodiments discussed herein include facilitating the mitigation of concept drift in O-RAN framework, while minimizing the risk of making wrong decisions based on inaccurate predictions. This holds value for O-RAN, especially for ML models used in Near-Real time and Real time use-cases, by improving the decisions made during the time between detection and mitigation. Additionally, the mitigation embodiments provided allows the application running the ML model to continue operating during the retraining step, rather than turning off the entire application to avoid and/or mitigate deterioration in the network performance.

Figure 3:
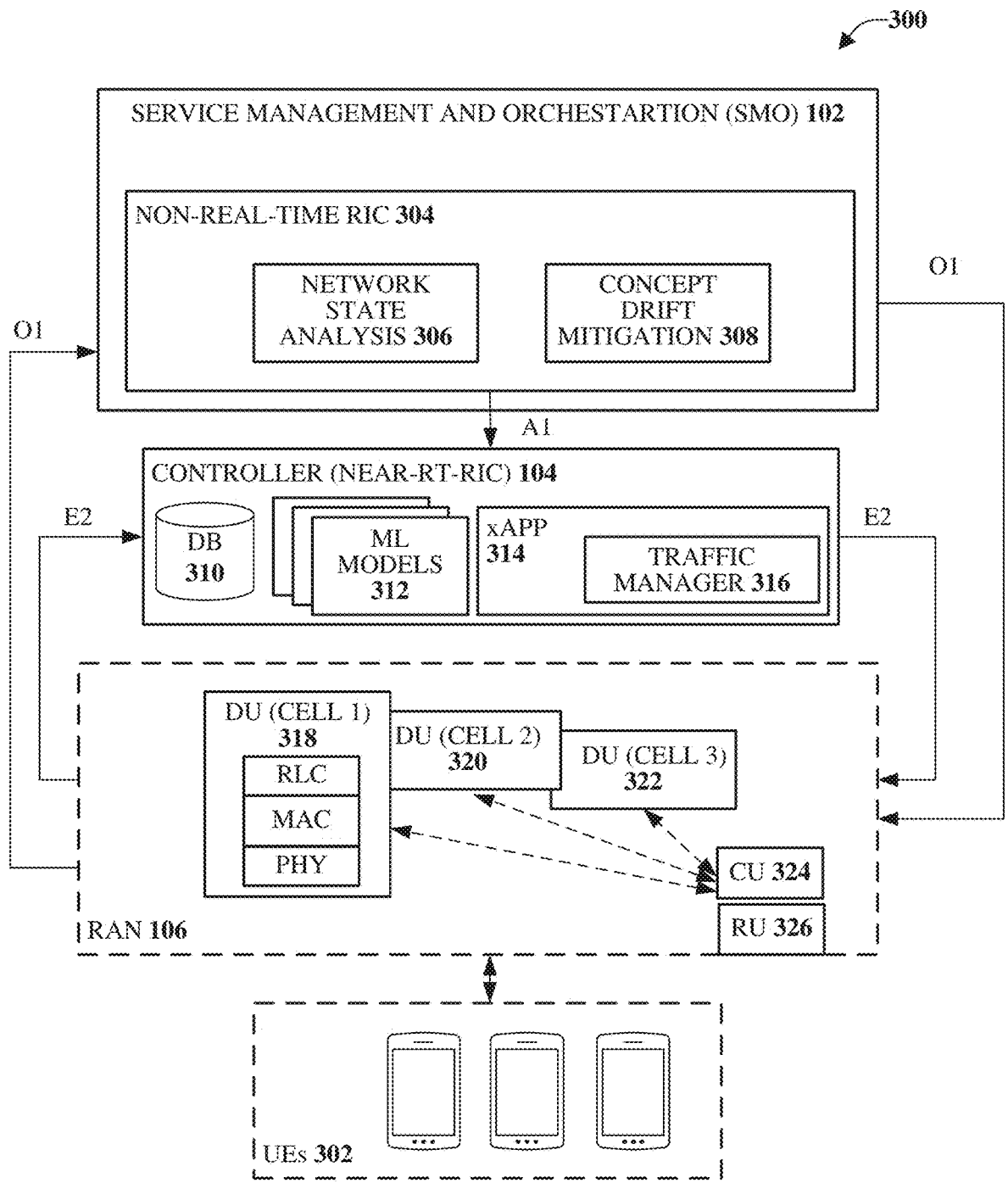
FIG. 3 illustrates an example, non-limiting, system architecture in accordance with one or more embodiments described herein.

FIG. 3 illustrates an example, non-limiting, system architecture 300 in accordance with one or more embodiments described herein. Repetitive description of like elements employed in other embodiments described herein is omitted for sake of brevity. The system architecture 300 can comprise one or more of the components and/or functionality of the telecommunications system 100 and vice versa. The system architecture 300 includes the SMO 102, the Near-RT-RIC 104 (e.g., a controller), and the RAN 106. Also included in the system architecture 300 are one or more UEs 302 that communicate with the RAN 106 via one or more communication links. As illustrated, the RAN 106 and SMO can communicate over an O1 interface. Further, the RAN 106 and Near-RT-RIC can communicate over an E2 interface.

The SMO 102 includes a Non-Real-Time RIC (Non-RT-RIC 304). The Non-RT-RIC 304 includes a network state analysis rApp component 306 and a concept drift mitigation rApp component 308. The Near-RT-RIC 104 includes at least one database 310, one or more ML models 312 (e.g., the ML model 110), and an xApp 314 that employs a traffic manager component 316.

Further, the RAN 106 includes one or more cells, illustrated as a first DU 318 (cell 1), a second DU 320 (cell 2), and a third DU 322 (cell 3). Although illustrated as three cells (or 3 DUs) there can be more than three. The respective DUs (e.g., the first DU 318, the second DU 320, the third DU 322) can include respective layers illustrated in the first DU 318, for purposes of simplicity, as a Radio Link Control (RLC) layer, a Medium Access Control (MAC) layer, and a Physical (PHY) layer. The respective DUs communicate with a CU 324. Also included in the system architecture 300 is a Radio Unit (RU 326).

The network state analysis rApp component 306 periodically (or at another time interval) monitors current network data and performs statistical tests to determine whether concept drift is likely to have occurred. If it is determined that concept drift might have occurred, the network state analysis rApp component 306 triggers another component to mitigate the effect.

The concept drift mitigation rApp component 308 is responsible for deploying a robust model when concept drift is detected. The concept drift mitigation rApp component 308 also triggers retraining for the previously deployed model. Further, concept drift mitigation rApp component 308 has functionality to reuse existing models from a model registry if the existing models are found applicable for the current network state. For example, the model registry can be retained or stored in a one or more memories, databases, and/or other data structures.

The traffic manager component 316 is responsible for distributing the traffic to the ML model over the collection of currently deployed models. This is performed when the retrained model is deployed, where the new model gradually receives an incremental percentage of the input traffic to the ML model. The traffic manager component 316 can also monitor the performance of the model and send the results to the network state analysis rApp component 306.

As discussed herein, advantages and novelties are provided, which include mitigation of the damage caused to the network while addressing concept drift and without the need to turn off (or deactivate) the entire application. Another advantage and novelty include reusing relevant models that were previously trained on specific network patterns. Yet another advantage and novelty include disaggregated architecture (e.g., O-RAN) based testing and comparing new ML models during deployment.

With continuing reference to FIG. 3, the SMO 102 operates as the management and orchestration layer that controls configuration and automation processes of RIC and RAN elements. The Non-RT-RIC 304 is an intelligent controller that hosts ML models and has access to data coming from the RAN 106 to validate and train these models. The network state analysis rApp component 306 monitors network KPIs and performs statistical analysis between training data and live data distributions to detect concept drift. The concept drift mitigation rApp component 308 deploys and/or trains robust ML models to adapt to network state changes. The concept drift mitigation rApp component 308 can trigger model retraining when concept drift is detected.

As it relates to the controller or Near-RT-RIC 104, the at least one database 310 can store key performance indicators. The xApp 314 is an application deployed to perform intelligent network optimization in the RAN 106. Further, the traffic manager component 316 directs ML model input to different deployed ML models according to a gradual increase based on model performance.

The network state analysis rApp component 306 is responsible for monitoring the current network state and based on the monitoring, can detect drifts from the training data used for the ML. The network state analysis rApp component 306 collects periodically network measurement data over the medium-long term. The specific period is configurable depending on the network environment under consideration. The configuration of the specific period can depend on the density of the area and/or other factors. According to some implementations, the specific period can be configured and/or reconfigured automatically by one or more computer systems employed by a mobile network operator (MNO).

The specific KPIs to be collected can vary based on the input features utilized by the ML Model (e.g., RSRP, SINR, Physical Resource Block (PRB) Usage, and so on). Other general KPIs can be utilized by the network state analysis rApp component 306 as general statistics about the network at a given time (e.g., average number of connected users per cell, RU antenna models, and so forth).

The network state analysis rApp component 306 can run (e.g., execute) statistical tests between the current network measurements and the measurements collected for the dataset on which the ML model was trained. The assumption is that concept drift is caused by a drift in the distribution of the input data, target variable, and/or other related variables that might change the relationship between an input and an output.

The statistical tests will perform hypothesis testing to determine with high confidence when the data from the current measurements and the training data measurements are not from the same distribution. The specific statistical test examples are provided in FIGS. 4 and 5 below.

The decision will be determined in a voting manner where the number of rejected hypotheses will be evaluated over the number of tests. When a majority of the tests determine a drift, the model performance score is retrieved. If the model performance has also deteriorated, the network state analysis rApp component 306 will detect concept drift. When the tests determine that a concept drift is highly likely, the network state analysis rApp component 306 triggers a Conflict Mitigation rApp to start the retraining process and deploy a temporary model.

Figure 4:
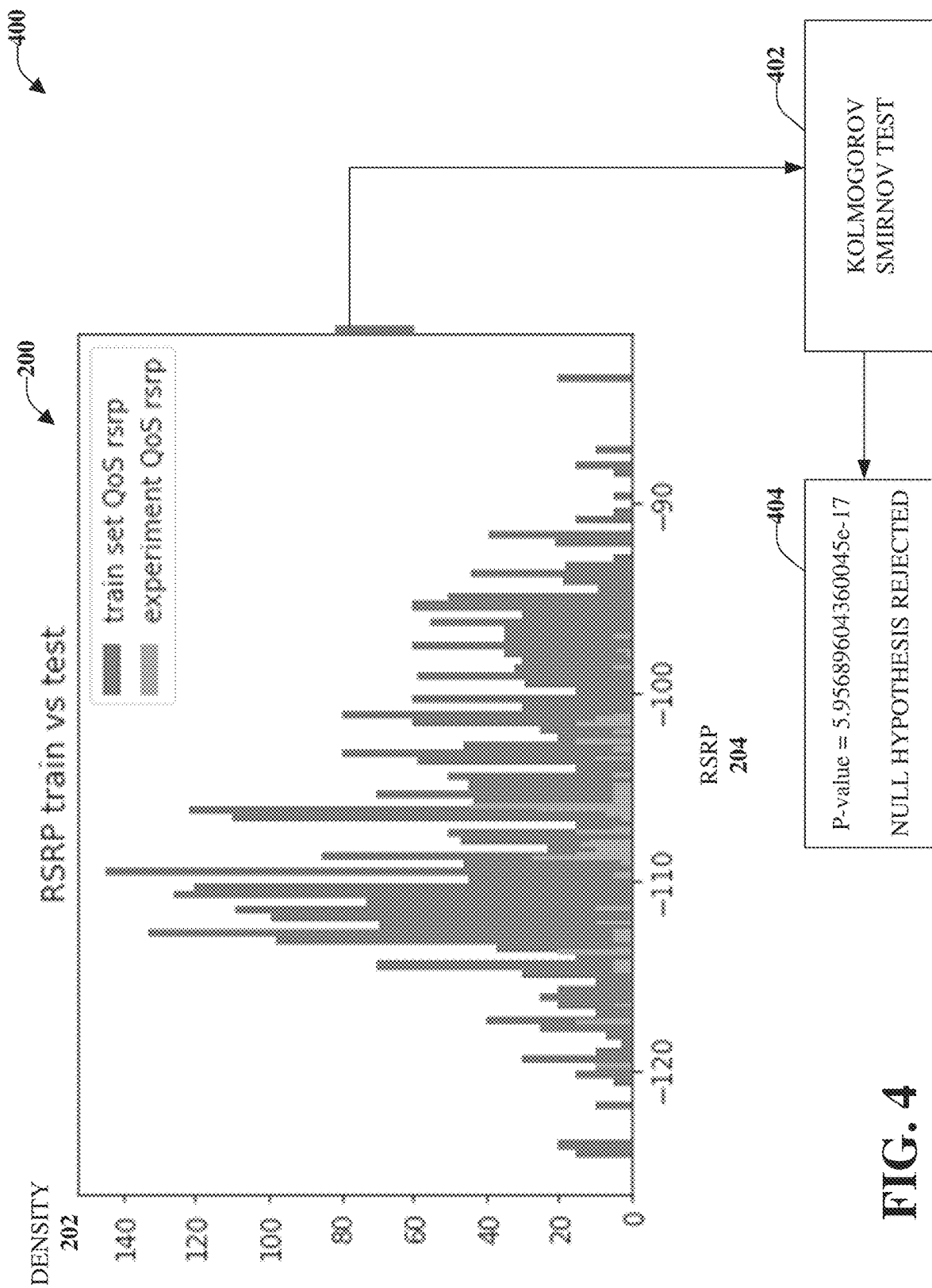
FIG. 4 illustrates an example, non-limiting, schematic representation of an analysis flow utilized by a network state analysis rApp for statistical tests used for hypothesis testing and a Kolmogorov-Smirnov (K-S) test in accordance with one or more embodiments described herein.

FIG. 4 illustrates an example, non-limiting, schematic representation of an analysis flow 400 utilized by the network state analysis rApp component 306 for statistical tests used for hypothesis testing and a Kolmogorov-Smirnov (K-S) test in accordance with one or more embodiments described herein. Repetitive description of like elements employed in other embodiments described herein is omitted for sake of brevity.

The statistical tests used for hypothesis testing can vary based on the data type of the measurements. FIG. 4 illustrates the use of the Kolmogorov-Smirnov (K-S) test 402. Numerical variables can be tested using Kolmogorov-Smirnov (K-S) test 402. The tests can be held to a high confidence level (e.g., 95-99%, for example) for more accurate results. As illustrated, values from the graph 200 can be input to the Kolmogorov-Smirnov (K-S) test 402, the results of the test can be evaluated, at 404, to determine if a P-value results in an acceptance or rejection of a null hypothesis. In the example of FIG. 4, the null hypothesis is rejected, at 404.

It is noted that categorical variables can be tested using Chi-Squared test. The Chi-Squared test can also be held to a high confidence level (e.g., 95-99%, for example) for more accurate results.

Figure 5:
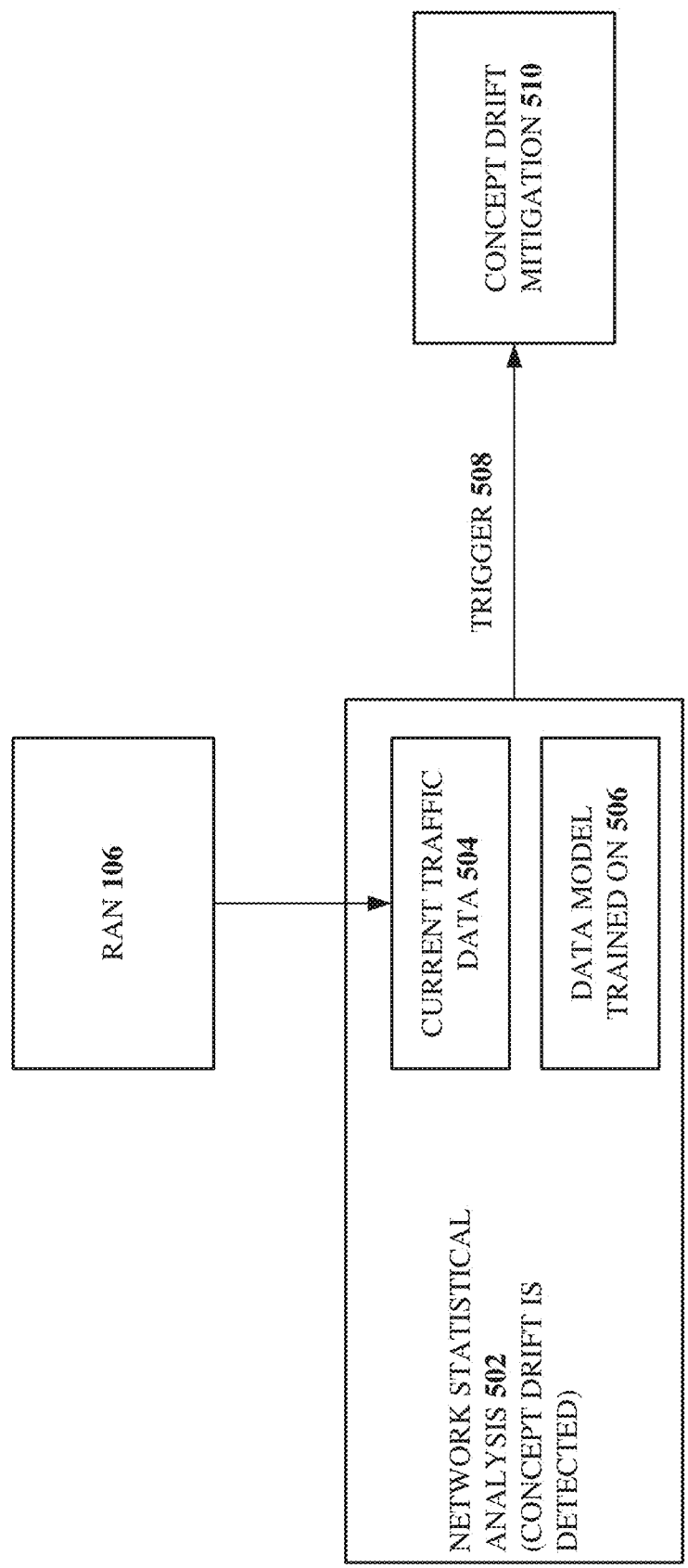
FIG. 5 illustrates an example, non-limiting, schematic representation of a network state analysis rApp in accordance with one or more embodiments described herein.

FIG. 5 illustrates an example, non-limiting, schematic representation of the network state analysis rApp component 306 in accordance with one or more embodiments described herein. Repetitive description of like elements employed in other embodiments described herein is omitted for sake of brevity.

A network statistical analysis component 502 can receive information from the RAN 106. The network statistical analysis component 502 can detect concept drift. For example, based on the information from the RAN, current traffic data 504 can be analyzed. Further, a data model 506 can be trained on the current traffic data. If concept drift is detected, a trigger is output, at 508, with an instruction to implement concept drift mitigation 510.

Figure 6:
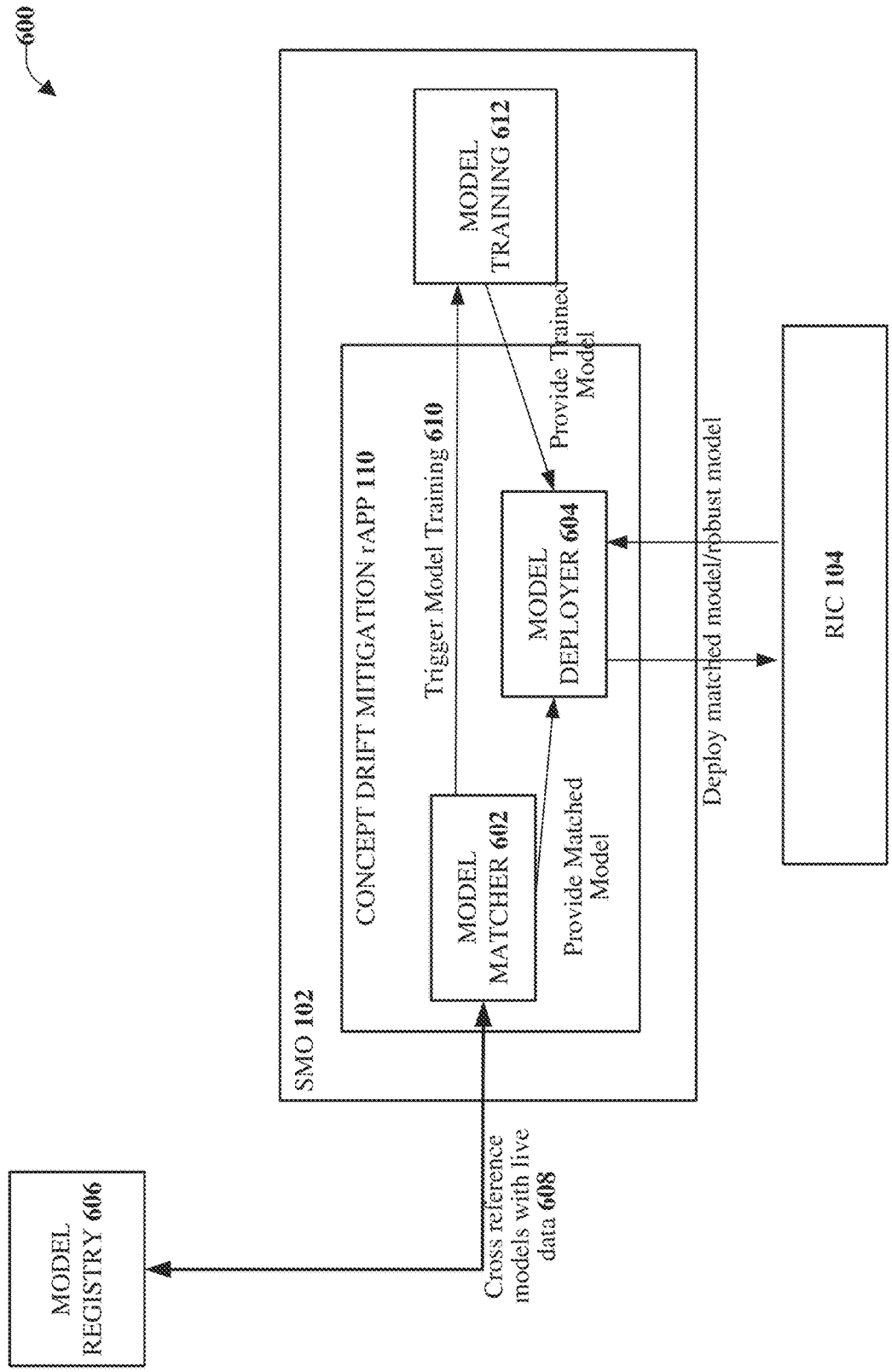
FIG. 6 illustrates an example, non-limiting, schematic representation of the concept drift mitigation rApp component in accordance with one or more embodiments described herein.

FIG. 6 illustrates an example, non-limiting, schematic representation of the concept drift mitigation rApp component 308 in accordance with one or more embodiments described herein. Repetitive description of like elements employed in other embodiments described herein is omitted for sake of brevity.

The concept drift mitigation rApp component 308 is responsible for addressing concept mitigation that the currently deployed model might be suffering from. In addition, the concept drift mitigation rApp component 308 can deploy a temporary model to decrease the prediction error while the new ML model is being retrained.

The concept drift mitigation rApp component 308 is triggered by the Network State Analysis rApp (e.g., the network state analysis rApp component 306) upon or after concept drift is detected on the current network state. Functionality is used by the concept drift mitigation rApp component 308 to either determine an existing model suitable for reuse, or trigger retraining for the ML model on newer network data to overcome concept drift.

While the complete and/or permanent mitigation of concept drift is being performed, the concept drift mitigation rApp component 308 deploys a temporary model (e.g., a Robust Model) to replace the deteriorating model in the meantime. As mentioned above, some Machine Learning model types can generalize better than others (e.g., Deep learning models scale better than Tree-based models). However, such models can be less accurate on data within the range of the training data. Therefore, such robust models may be deployed during concept drift mitigation as they will scale their predictions better, until an accurate model is retrained on updated data. It is noted that a robust model is a model trained to fit wider ranges of data, yet it is not as accurate as models which are specific for certain types of data.

Upon or after the retraining is completed, the retrained model is deployed to the RIC alongside the deployed "Robust" model. The value of such component (e.g., the concept drift mitigation rApp component 308) resides in the provision of the temporary model and facilitating the retrieval of an updated model to completely mitigate the issue.

With continuing reference to FIG. 6, the concept drift mitigation rApp component 308 includes a model matcher component 602 and a model deployer component 604. A model registry 606 can be utilized to cross reference models with live data, as indicated by the communication 608 between the model registry 606 and the model matcher component 602. For example, the Network State Analysis rApp (e.g., the network state analysis rApp component 306) can trigger Concept Drift Mitigation functionality whenever a concept drift is detected.

The Concept Drift Mitigation functionality can cross reference models in the model registry 606 with live data to find a matching model (e.g., via the model matcher component 602). If a model is found in the model registry 606 that matches the current situation, the model matcher component 602 can provide the matched model to the model deployer component 604.

Alternatively, if a matching model is not found, model training can be triggered, as indicated at 610 and a model training component 612 can facilitate training (or retraining) of one or more models. Further, a robust model can be deployed until a model can be trained on the new data. This can mitigate any delay and/or a current model taking inaccurate decisions until the Model Retraining functionality takes a decision. Upon or after the new model is trained, the trained model can be provided to a model deployer component 604. The matched model and/or robust model can be deployed to the Near-RT-RIC 104.

Figure 7:
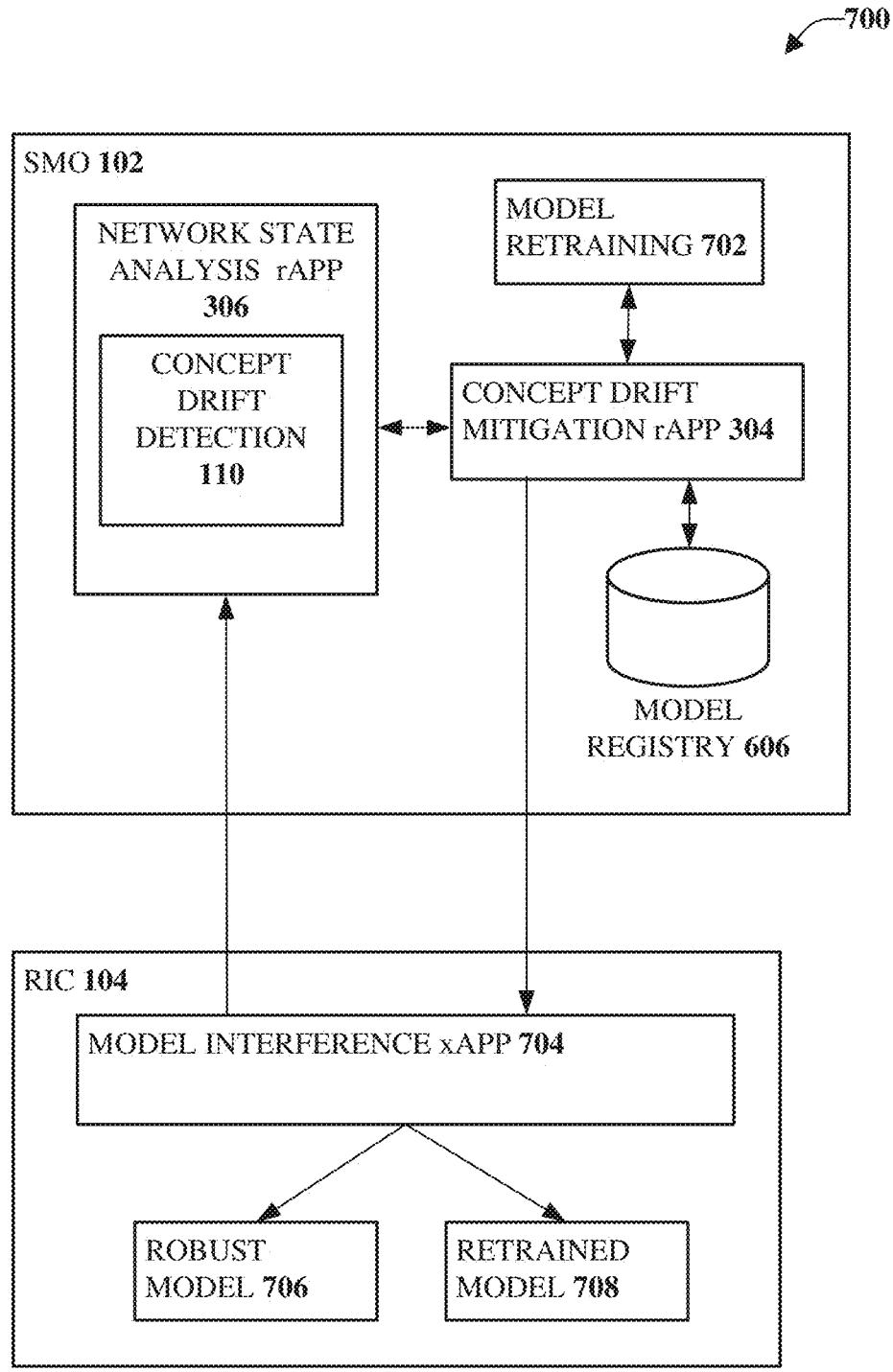
FIG. 7 illustrates an example, non-limiting, schematic representation of the model retraining in accordance with one or more embodiments described herein.

FIG. 7 illustrates an example, non-limiting, schematic representation of the model retraining in accordance with one or more embodiments described herein. Repetitive description of like elements employed in other embodiments described herein is omitted for sake of brevity.

Illustrated in FIG. 7 are the SMO 102 and the Near-RT-RIC 104. The SMO includes the network state analysis rApp component 306, the concept drift mitigation rApp component 308, the model registry 606, and a model retraining component 702. The Near-RT-RIC 104 includes a model inference xApp component 704, one or more robust models 706, and one or more retrained models 708.

As a function of the SMO 102, the Network State Analysis rApp (e.g., network state analysis rApp component 306) collects model performance measurements from the Near-RT-RIC 104. The model performance measurements can be collected periodically, continually, based on detection of one or more events, and/or at another time interval. The model performance measurements can be passed to the Concept Drift Detection functionality (e.g., the concept drift mitigation rApp component 308).

Upon or after concept drift is detected, the Concept Drift Mitigation rApp is notified and the collected metrics are first cross referenced with the existing models inside the model registry 606. If an applicable model is found, the applicable model is retrieved from the model registry 606. Otherwise, the data is used to train a new model in the SMO 102 and the retrained model is then saved to the model registry 606.

The selected model, which can be either the newly trained model or the existing model retrieved from the registry, is sent to the Model Inference xApp (model inference xApp component 704) to be deployed inside the Near-RT-RIC 104 as the Retrained Model. If a Retrained Model is already deployed inside the Near-RT-RIC 104, that retrained model is replaced by the newly trained model. The Robust Model remains deployed to be used as a fallback if concept drift is detected in the future.

Figure 8:
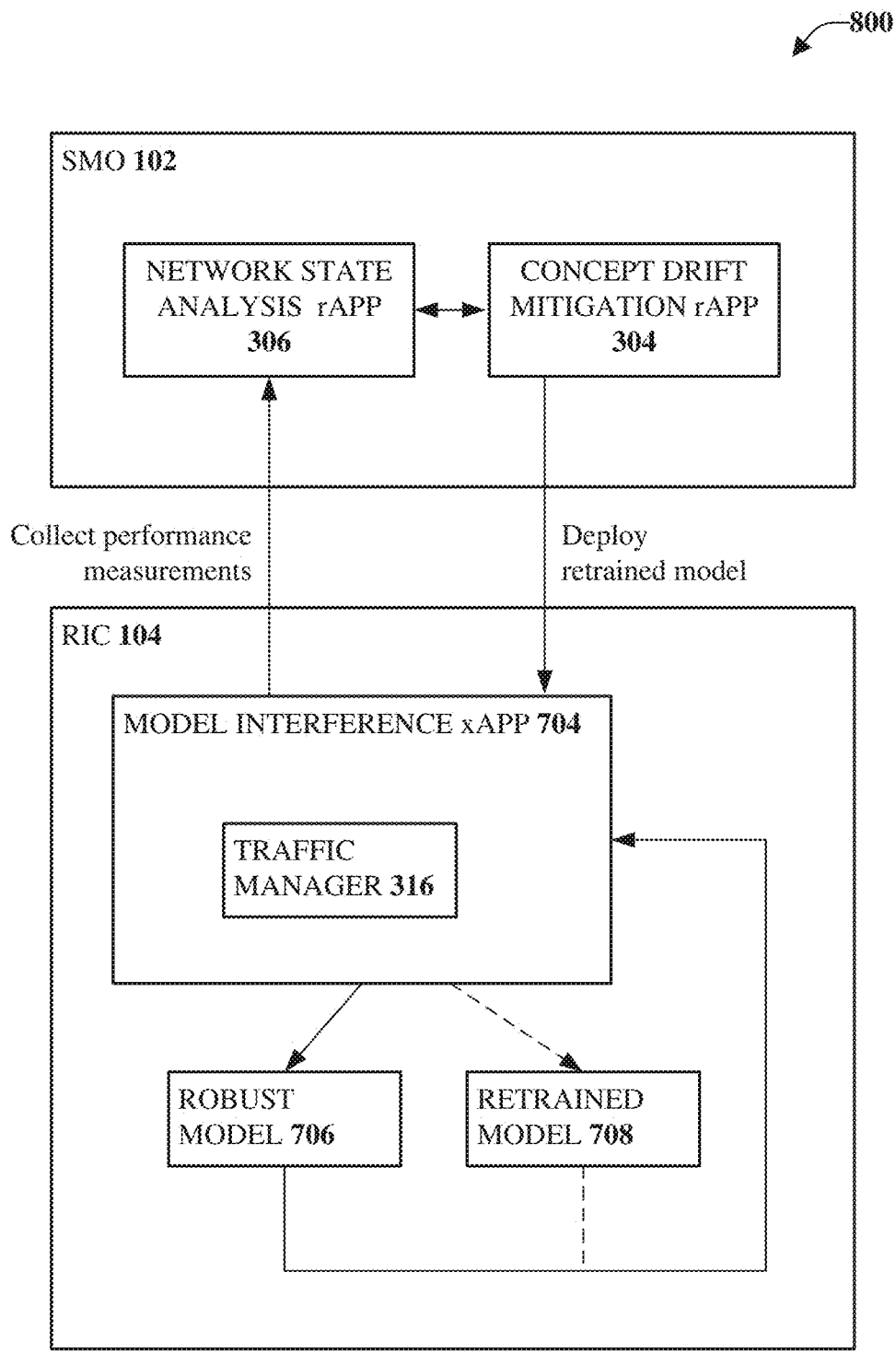
FIG. 8 illustrates an example, non-limiting, schematic representation of a model deployment strategy in accordance with one or more embodiments described herein.

FIG. 8 illustrates an example, non-limiting, schematic representation of a model deployment strategy in accordance with one or more embodiments described herein. Repetitive description of like elements employed in other embodiments described herein is omitted for sake of brevity.

Illustrated in FIG. 8 are the SMO 102 that includes the network state analysis rApp component 306 and the concept drift mitigation rApp component 308. The Near-RT-RIC 104 includes the model inference xApp component 704, the one or more robust models 706, the one or more retrained models 708, and the traffic manager component 316. For purposes of simplicity other components and/or features of the SMO 102 and/or Near-RT-RIC 104 are not illustrated in FIG. 8 or other figures.

Upon or after the Concept Drift Mitigation rApp (e.g., the concept drift mitigation rApp component 308) detects evidence for Concept Drift and trains a new model, the Concept Drift Mitigation rApp notifies or instructs the Model Inference xApp (e.g., model inference xApp component 704) to deploy the newly trained model.

Initially, the Model Inference xApp can send all requests (or a substantial portion of requests, or a defined percentage of requests) to a robust model 706. Upon or after the newly trained model is deployed, the model evaluation phase starts, and the percentage of requests routed to the retrained model 708 is gradually increased. The model evaluation phase ends when the percentage becomes 100% and all requests are sent to the Retrained Model.

The network operator (and/or one or more computer systems associated with the network operator) controls the speed at which the percentage of requests routed to the Retrained Model increases. This control can be facilitated by explicitly configuring the total data size needed to be routed to the Retrained Model during the model evaluation phase, for example.

Performance measurements are collected from the deployed models and sent to the Network State Analysis rApp. If the performance of the Retrained Model falls below the performance of the Robust Model during the model evaluation phase, the Model Inference xApp is notified or instructed to disable the Retrained Model and use only the Robust Model, for example. Thereafter, the model retraining process starts again.

Figure 9:
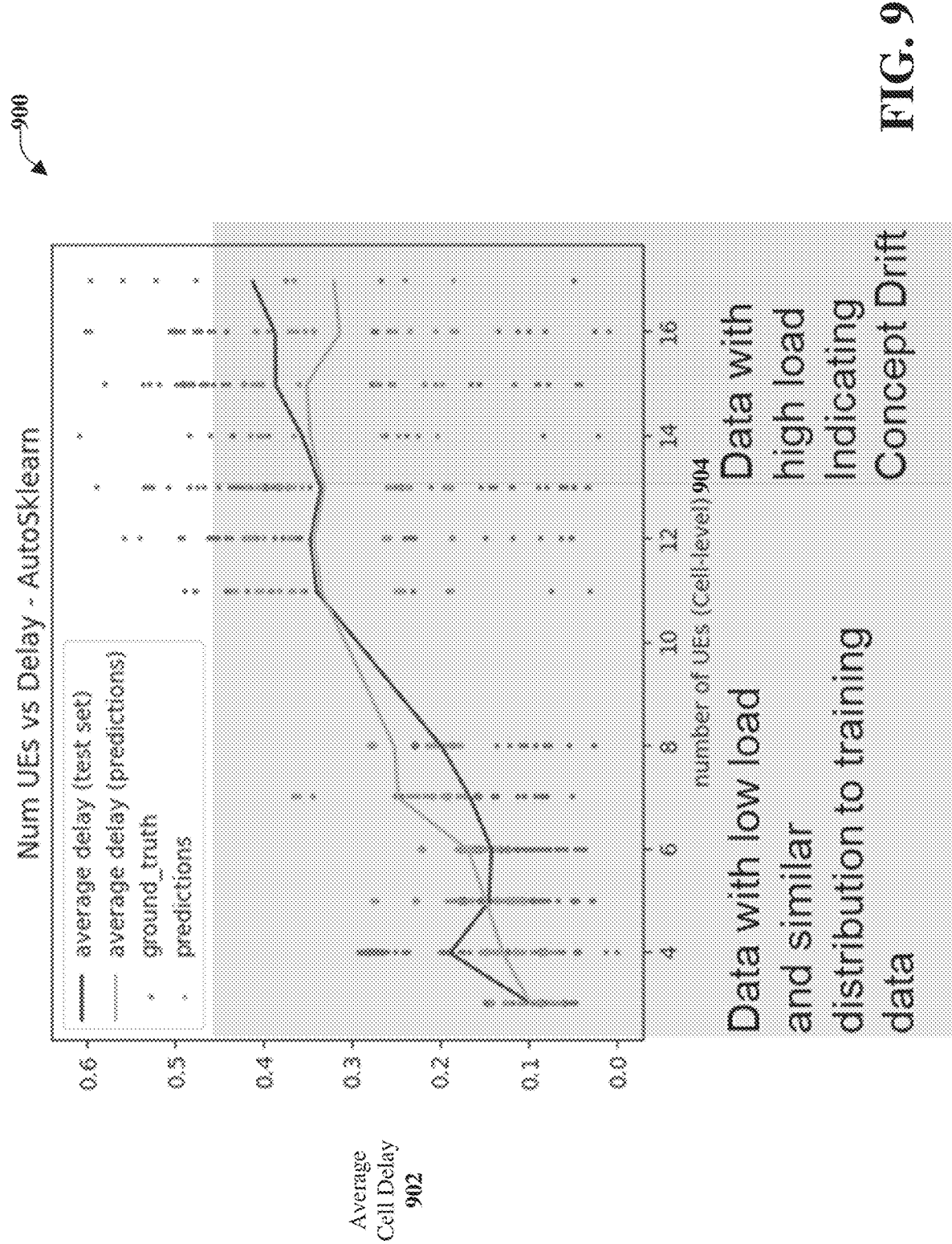
FIG. 9 illustrates an example, non-limiting, graph of a first use case utilizing a tree-based model in accordance with one or more embodiments described herein.

FIG. 9 illustrates an example, non-limiting, graph 900 of a first use case utilizing a tree-based model in accordance with one or more embodiments described herein. For this first use case example, a tree-based model was trained to predict average delay of users on a cell based on number of UEs on a cell. Depicted on the vertical axis (Y-axis) is the average cell delay 902. Depicted on the horizontal axis (X-axis) is the number of UEs (cell level) 904.

The tree-based model was trained on data that had 1 to 13 UEs per cell. It was determined that the tree-based model would accurately predict the average delay when the number of UEs on the cell was within the range of the training data.

When the capacity of the cell capacity was increased and it was able to take in more UEs, the tree-based model started to fail when predicting the delay. This indicated a concept drift as shown by the graph 900. This triggered a retraining on the live data in order for a more accurate model to be deployed.

Figure 10:
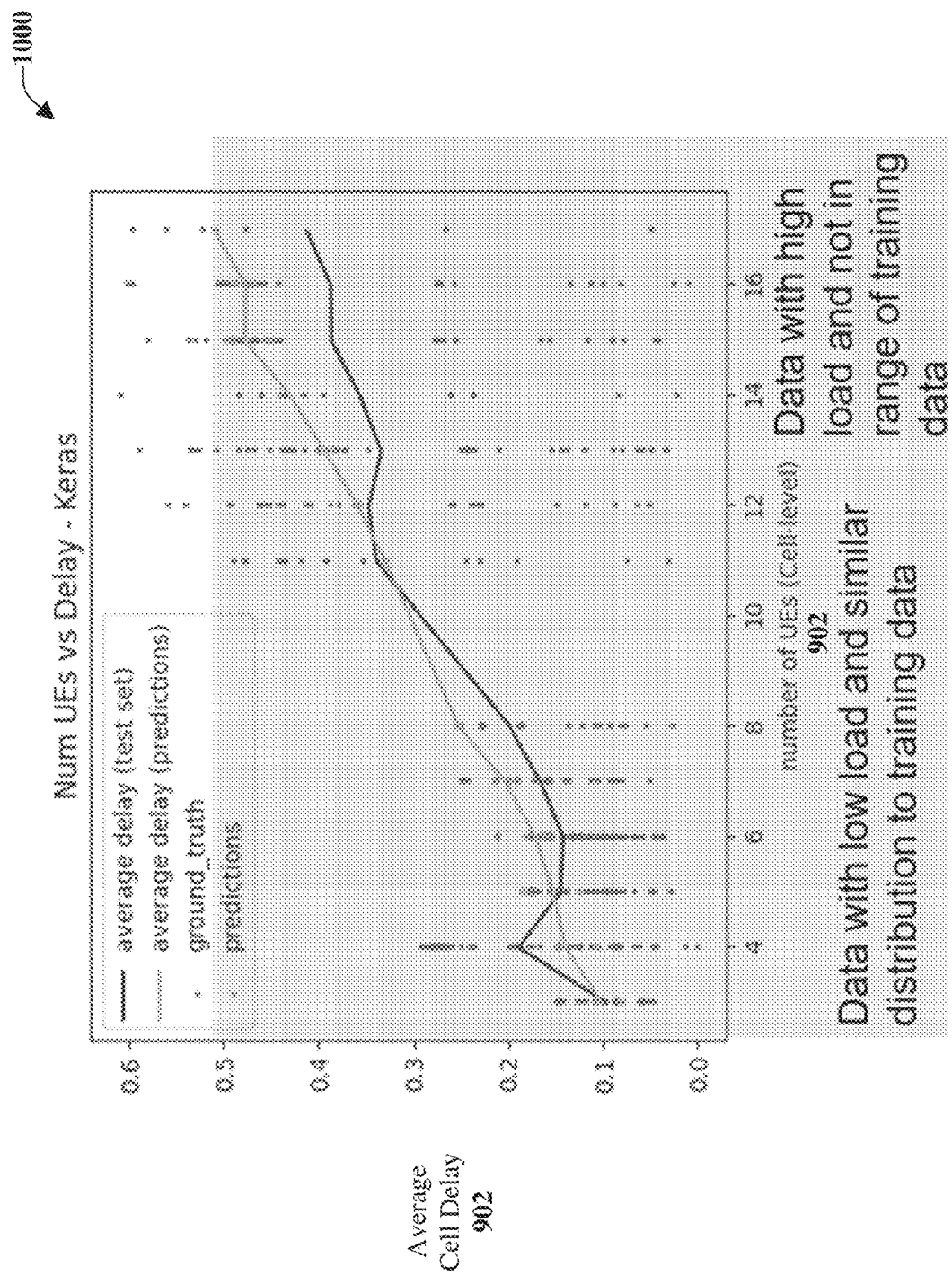
FIG. 10 illustrates an example, non-limiting, graph of a second use case utilizing a neural network model in accordance with one or more embodiments described herein.

According to some implementations, a less accurate but more robust Neural Network Model could be deployed in the interim to handle the data until the retrained model is ready as shown in FIG. 10, which illustrates an example, non-limiting, graph 1000 of a second use case utilizing a neural network model in accordance with one or more embodiments described herein.

Figure 11:
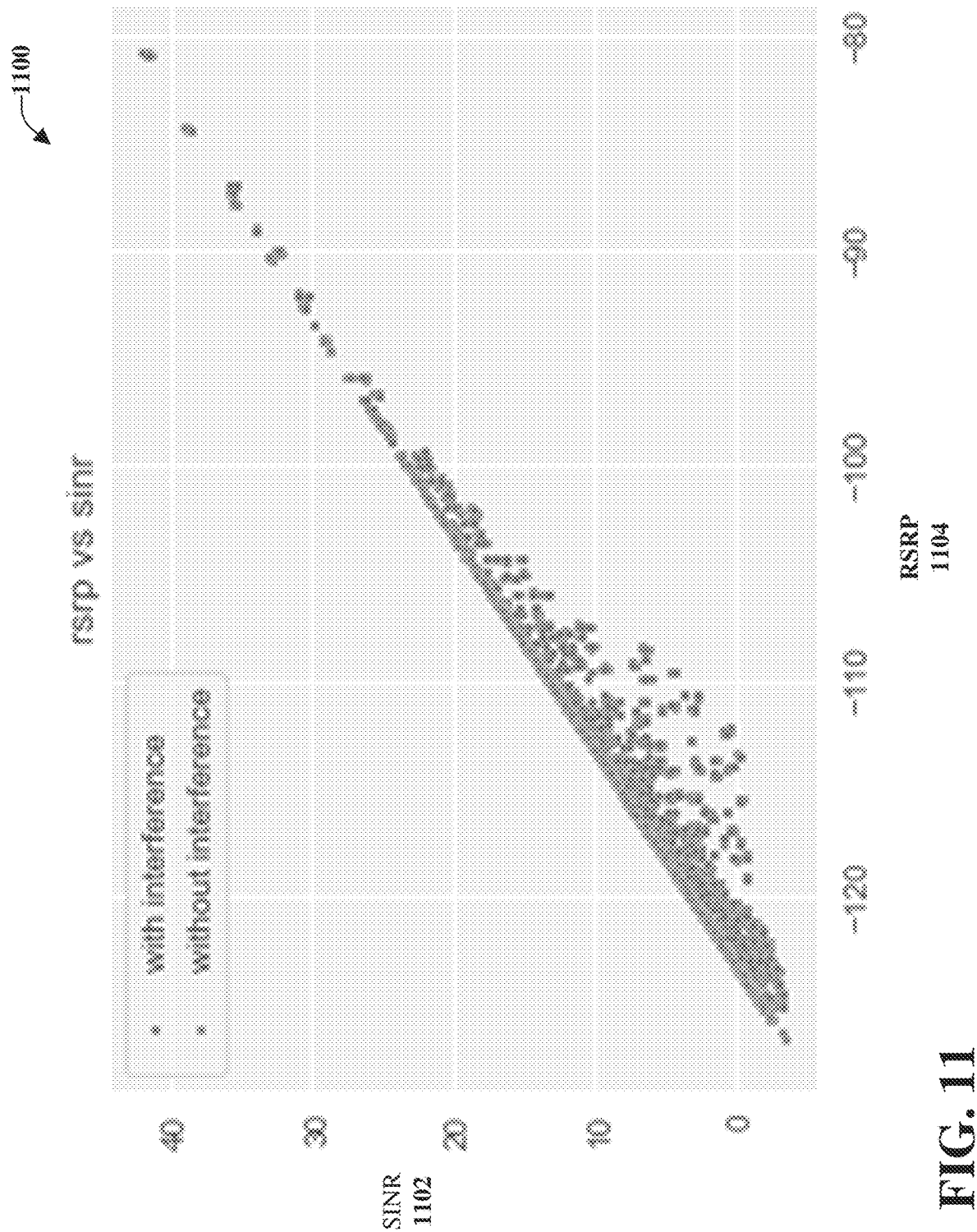
FIG. 11 illustrates an example, non-limiting, graph of References Signal Received Power (RSRP) verses Signal to Interference Noise Ratio (SINR) for a third use case utilizing a linear model in accordance with one or more embodiments described herein.
Figure 12:
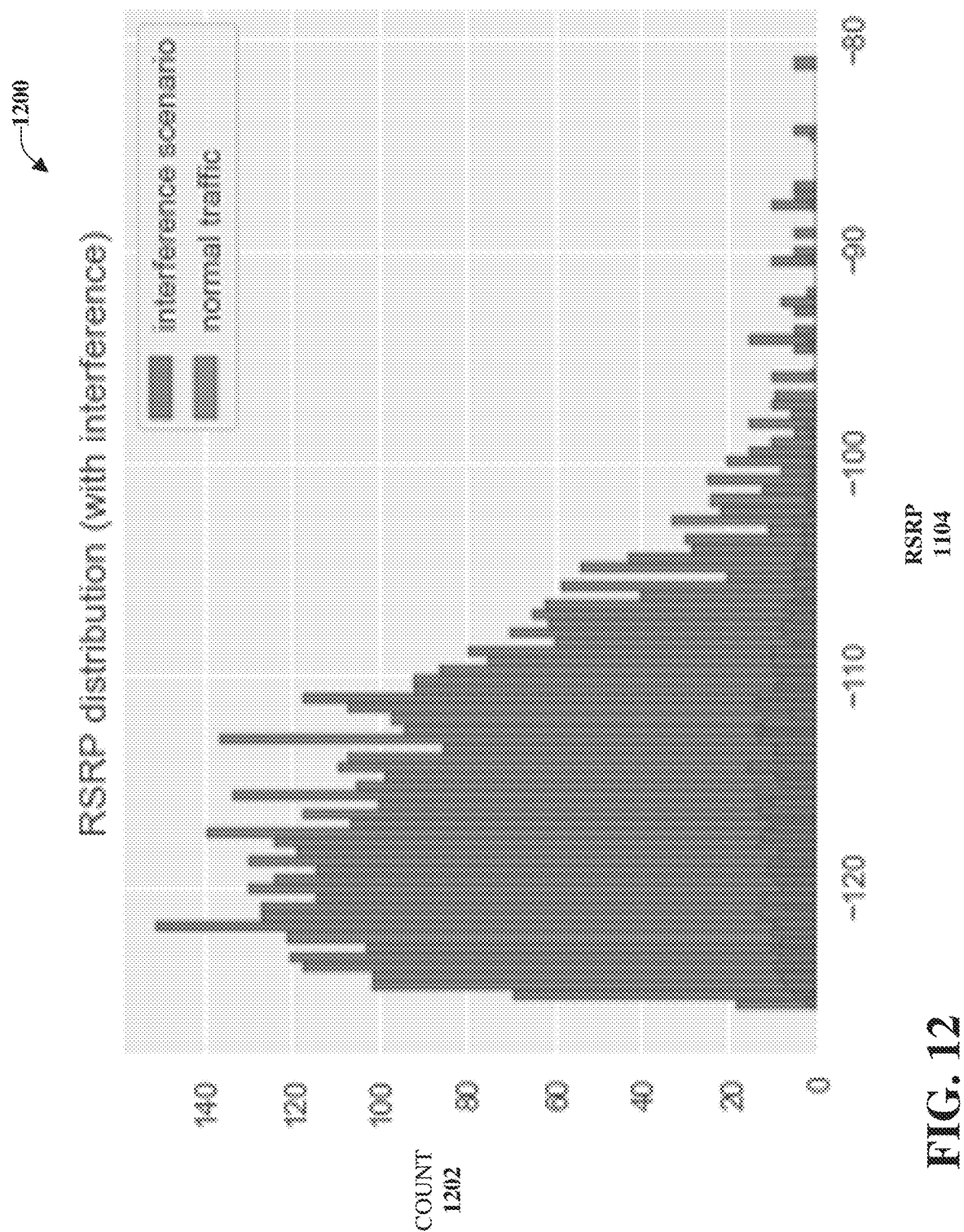
FIG. 12 illustrates an example, non-limiting, graph of RSRP distribution (without interference) for the third use case of FIG. 11 in accordance with one or more embodiments described herein.

FIG. 11 illustrates an example, non-limiting, graph 1100 of RSRP verses SINR for a third use case utilizing a linear model in accordance with one or more embodiments described herein. FIG. 12 illustrates an example, non-limiting, graph 1200 of RSRP distribution (without interference) for the third use case of FIG. 11 in accordance with one or more embodiments described herein. A linear model was deployed and used to detect interference based on the relationship between RSRP and SINR as depicted in FIG. 11 and FIG. 12.

Based on current data (e.g., the data during the example of the third use case) the RSRP vs SINR relationship is only trained on RSRP data between −130 & −80 dbm, in an example. If more and more traffic starts moving in the −70 to −60 dbm due to improvements in network deployment and/or environmental changes that occurred, a concept drift would have occurred, and a new model would need to be retrained and deployed. A robust Neural Network Model could be deployed in the interim to handle the data until the retrained model is ready, according to some implementations.

Figure 13:
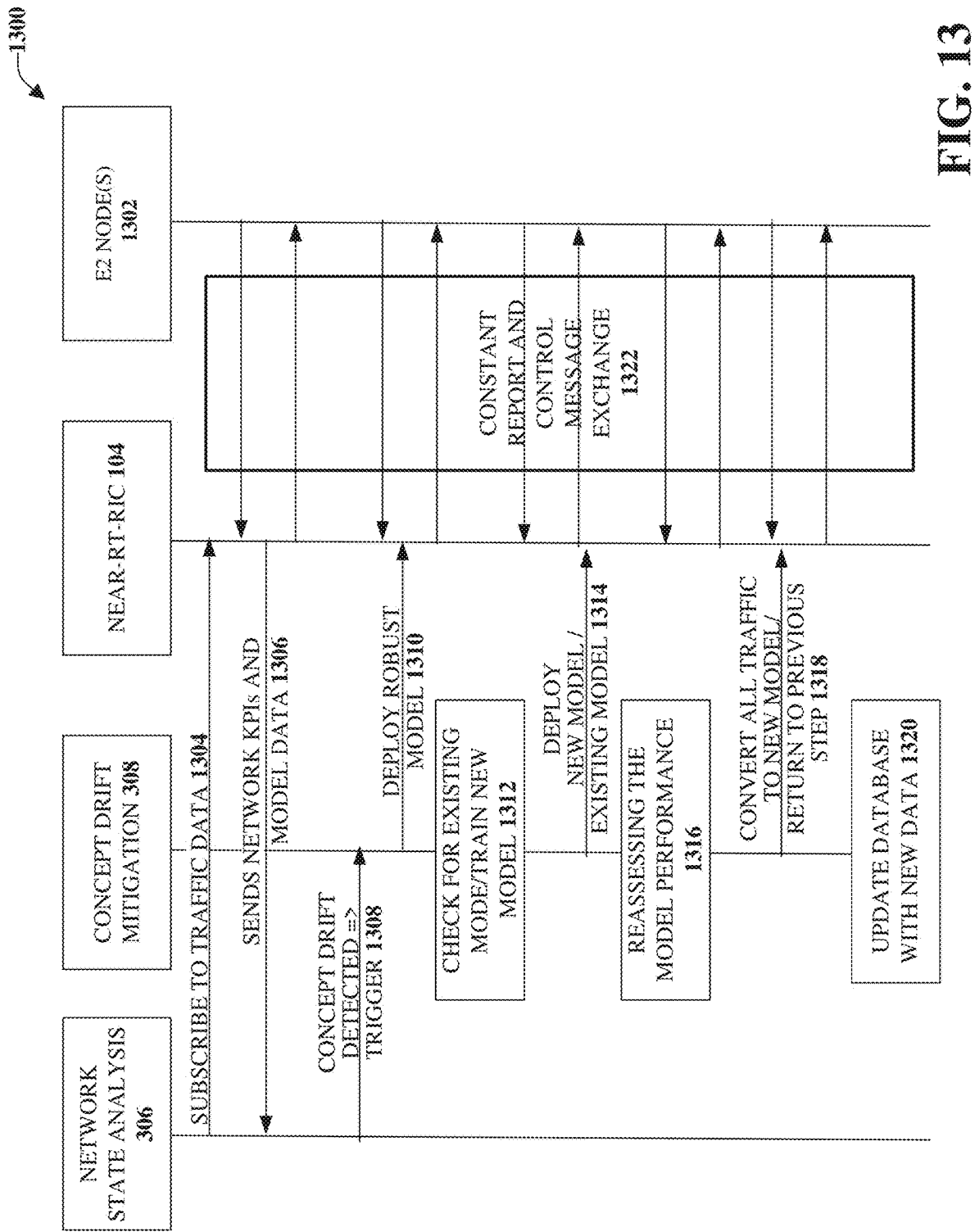
FIG. 13 illustrates an example, non-limiting, message sequence flow chart that can facilitating the messaging between various network equipment in accordance with one or more embodiments described herein.

FIG. 13 illustrates an example, non-limiting, message sequence flow chart 1300 that can facilitate the messaging between various network equipment in accordance with one or more embodiments described herein. Repetitive description of like elements employed in other embodiments described herein is omitted for sake of brevity.

As illustrated, the message sequence flow chart 1300 represents the message sequence between the network state analysis rApp component 306, the concept drift mitigation rApp component 308, the Near-RT-RIC 104, and one or more E2 nodes 1302. As used herein, the term "network equipment" can be interchangeable with (or can include) a network, a network controller, or any number of other network components.

A message subscribed to the data 1304 can be sent from the network state analysis rApp component 306 to the Near-RT-RIC 104. The Near-RT-RIC 104 can reply, at 1306, by sending to the network state analysis rApp component 306 one or more network KPIs and model data. Based on detection of concept drift, at 1308 a message can be sent from the network state analysis rApp component 306 to the concept drift mitigation rApp component 308. The message at 1308 can include information indicative of the detection of the concept drift and can be a trigger to facilitate mitigation of the concept drift. Upon or after receipt of the message, the concept drift mitigation rApp component 308 can send, to the Near-RT-RIC 104 a message with an instruction to deploy a robust model.

Upon or after sending the message, at 1310, the concept drift mitigation rApp component 308 can check for an existing model and/or train a new model at 1312. Upon or after determining an existing model is available and/or a new model is trained, at 1314, the concept drift mitigation rApp component 308 sends an instruction to the Near-RT-RIC 104 to deploy the new model or the existing model.

At 1316, the concept drift mitigation rApp component 308 can reassess the model performance. Based on the reassessment, at 1318, the concept drift mitigation rApp component 308 can send a message to the Near-RT-RIC 104 with one or more instructions to convert all traffic to the new model and to return to the previous step. Further, at 1320, the concept drift mitigation rApp component 308 updates the database with new data.

In addition, concurrently with the above noted message flows, the Near-RT-RIC 104 and the E2 Nodes 1302 can perform constant (or nearly constant) report and control message exchange as indicated by box 1322.

Figure 14:
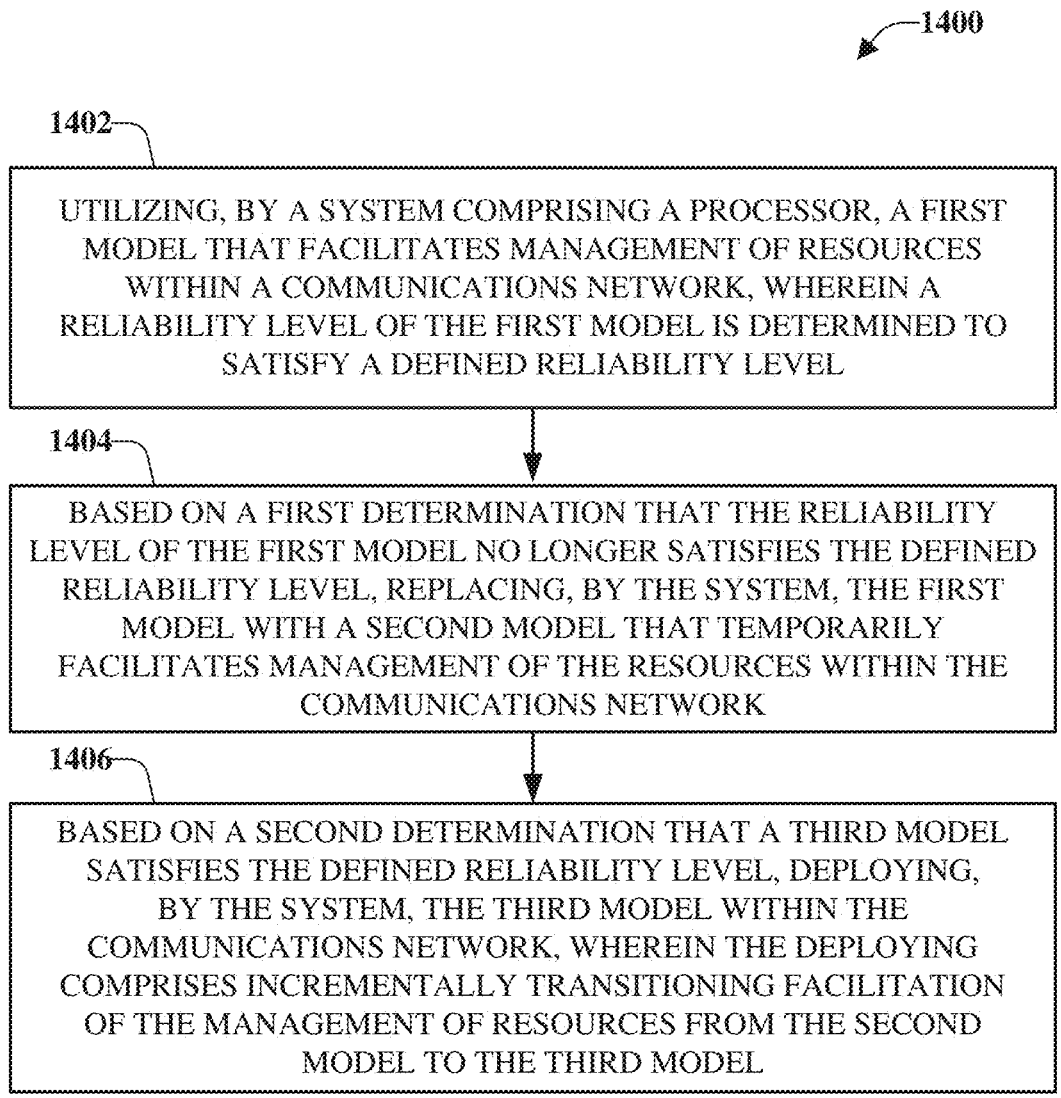
FIG. 14 illustrates a flow diagram of an example, non-limiting, computer-implemented method that facilitates intelligent concept drift mitigation in advanced communication networks in accordance with one or more embodiments described herein.

FIG. 14 illustrates a flow diagram of an example, non-limiting, computer-implemented method 1400 that facilitates intelligent concept drift mitigation in advanced communication networks in accordance with one or more embodiments described herein. The computer-implemented method 1400 and/or other methods discussed herein can be implemented by a system comprising a processor and a memory. In an example, the system can be implemented by a network equipment of a disaggregated network architecture. It is noted that the embodiment of FIG. 14 is discussed with respect to being deployed within an O-RAN framework, however, the disclosed embodiments are not limited to an O-RAN framework.

The computer-implemented method 1400 starts at 1402, when a system comprising a processor utilizes a first model that facilitates management of resources within a communications network. A reliability level of the first model is determined to satisfy a defined reliability level. For example, the reliability level can be any value determined to be acceptable according to a design criterion.

Over time, the reliability level of the first model may no longer satisfy the reliability level. Thus, based on a first determination that the reliability level of the first model no longer satisfies the defined reliability level, at 1404, the system replaces the first model with a second model that temporarily facilitates management of the resources within the communications network.

Further, at 1406 of the computer-implemented method 1400 and based on a second determination that a third model satisfies the defined reliability level, the system deploys the third model within the communications network. Deployment of the third model can include incrementally transitioning facilitation of the management of resources from the second model to the third model. According to some implementations, the third model can be the first model, which has been retrained. In some implementations, the third model can be a model selected from a group of existing models, resulting in a selected existing model that is suitable for reuse in the communications network. In accordance with some implementations, the third model can be a model other than the first model that has been retrained (e.g., an existing model can be retrained, or a new model can be trained).

Figure 15:
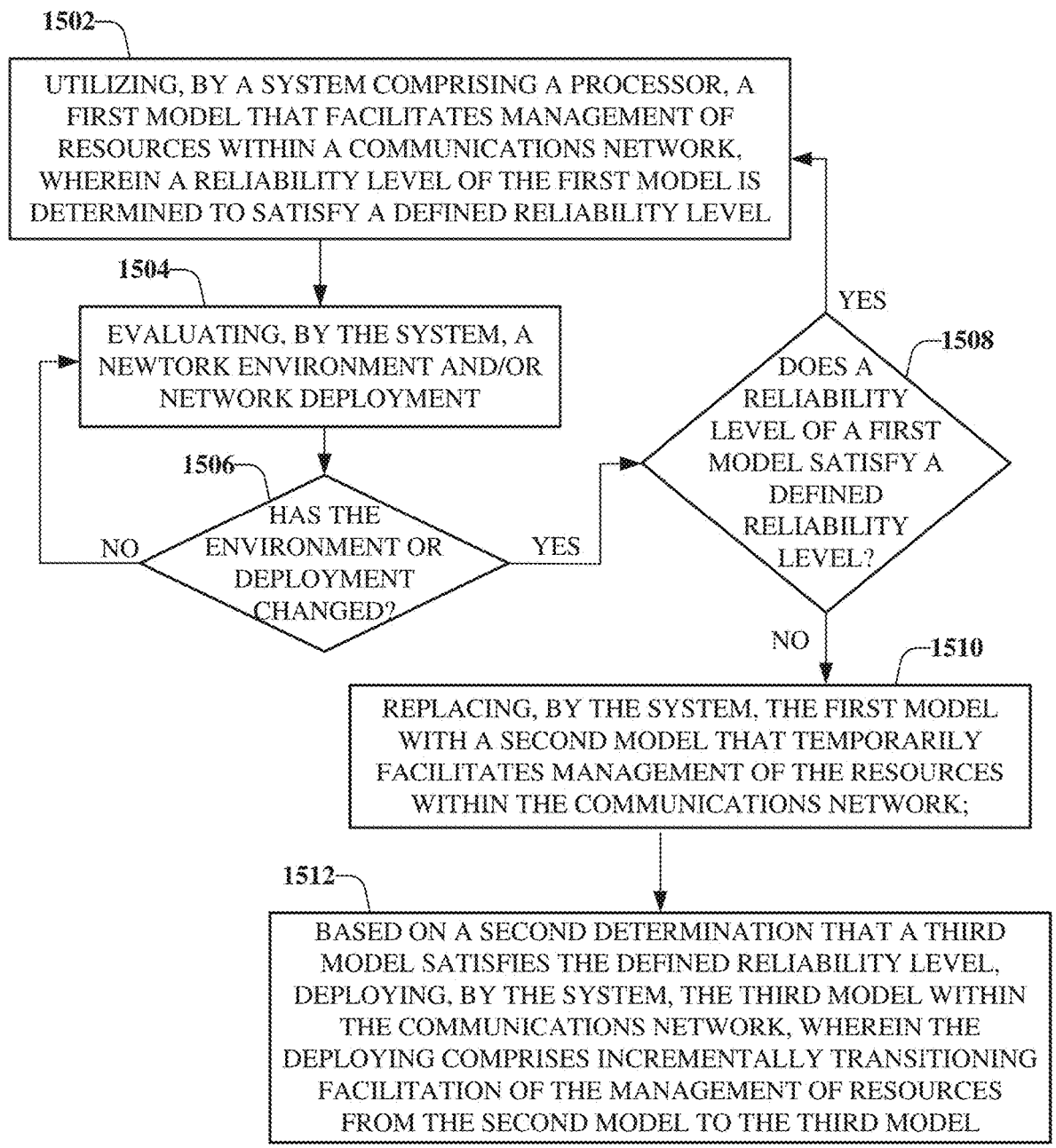
FIG. 15 illustrates another flow diagram of an example, non-limiting, computer-implemented method that evaluates a network and performs a model update in advanced communication networks in accordance with one or more embodiments described herein.

FIG. 15 illustrates another flow diagram of an example, non-limiting, computer-implemented method 1500 that evaluates a network and performs a model update in advanced communication networks in accordance with one or more embodiments described herein. The computer-implemented method 1500 and/or other methods discussed herein can be implemented by a system comprising a processor and a memory. In an example, the system can be implemented by a network equipment of a disaggregated network architecture. It is noted that the embodiment of FIG. 15 is discussed with respect to being deployed within an O-RAN framework, however, the disclosed embodiments are not limited to an O-RAN framework.

At 1502, a first model that facilitates management of resources within a communications network is utilized based on a reliability level of the first model being determined to satisfy a defined reliability level. At 1504, a network environment and/or a network deployment are evaluated. The evaluation can be based on information received from one or more network equipment and/or one or more UEs.

A determination is made, at 1506, whether the network environment and/or the network deployment has changed. If no change is detected ("NO"), the computer-implemented method 1500 returns to 1504 with continuing evaluation. Alternatively, if a change is detected ("YES"), at 1508 a determination is made whether a reliability level of a first model satisfies a defined reliability level. If the first model continues to satisfy the defined reliability level ("YES"), the first model is continued to be used and the computer-implemented method 1500 returns to 1502 with continuing evaluation.

Alternatively, if the determination at 1506 is that the reliability level of the first model fails to satisfy the defined reliability level ("NO"), at 1510, the first model is replaced with a second model that temporarily facilitates management of the resources within the communications network.

Further, based on a second determination that a third model satisfies the defined reliability level, at 1512, the third model is deployed within the communications network. The deploying can include incrementally transitioning facilitation of the management of resources from the second model to the third model.

According to an implementation, the third model is the first model (or another model) that has been retrained (e.g., a retrained first model). Thus, in this implementation, prior to deploying the third model at 1512, the computer-implemented method 1500 retrains the first model at 1514. For example, the first model can be trained on a set of current network data associated with the communications network. The first model is retrained to facilitate the management of the resources to a defined confidence level.

Figure 16:
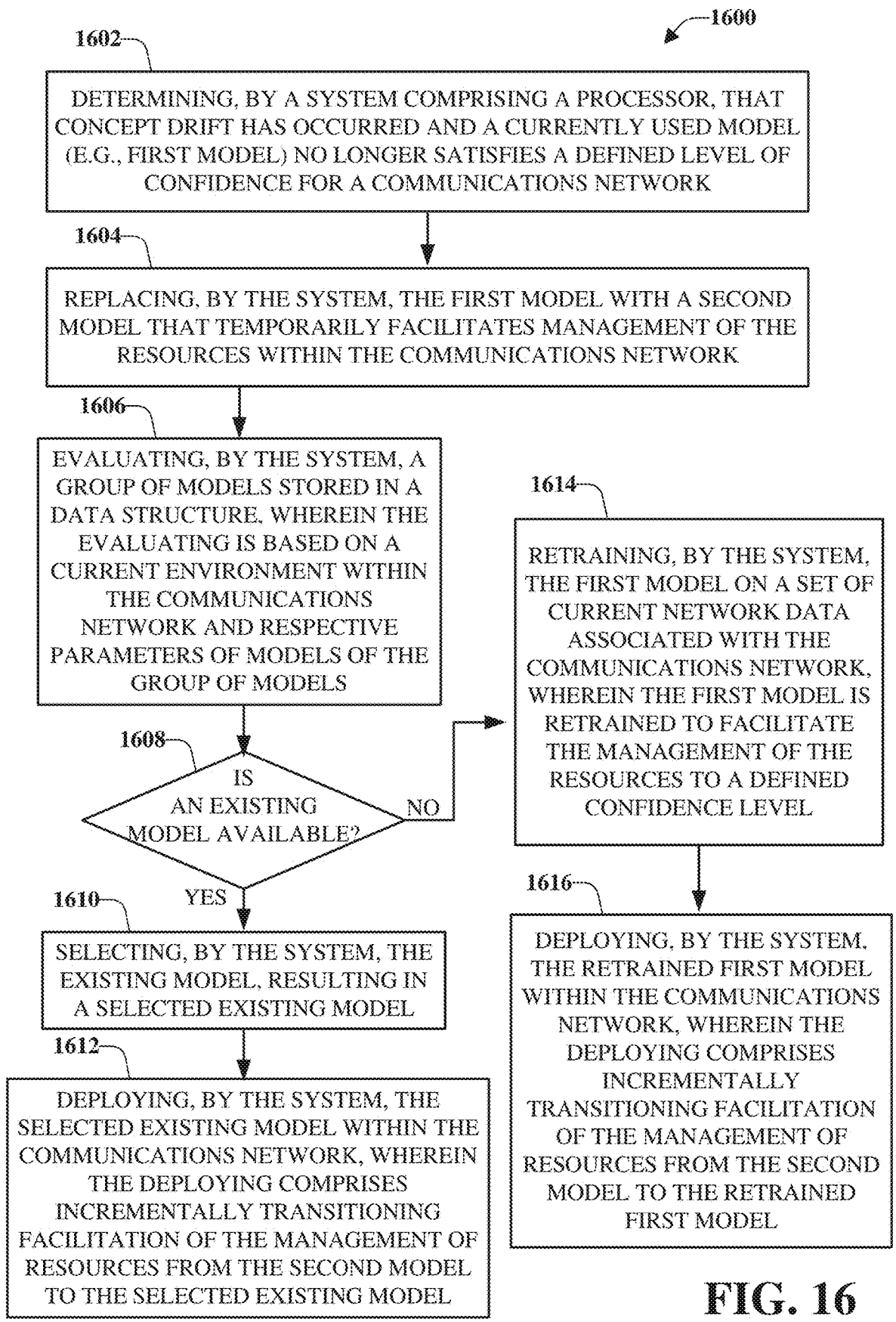
FIG. 16 illustrates another flow diagram of an example, non-limiting, computer-implemented method that retrains a current model or reuses an existing model in accordance with one or more embodiments described herein.

FIG. 16 illustrates another flow diagram of an example, non-limiting, computer-implemented method 1600 that retrains a current model or reuses an existing model in accordance with one or more embodiments described herein. The computer-implemented method 1600 and/or other methods discussed herein can be implemented by a system comprising a processor and a memory. In an example, the system can be implemented by a network equipment of a disaggregated network architecture. It is noted that the embodiment of FIG. 16 is discussed with respect to being deployed within an O-RAN framework, however, the disclosed embodiments are not limited to an O-RAN framework.

At 1602 a determination is made that concept drift has occurred and a currently used model (e.g., first model) no longer satisfies a defined level of confidence for a communications network. Upon or after the determination, at 1604, the first model is replaced with a second model that temporarily facilitates management of the resources within the communications network. While the second model is temporarily facilitating management of the resources, either an existing model can be selected to replace the second model, or the first model (or another model) can be retrained to replace the second model.

For the implementations that utilized an existing model, the computer-implemented method 1600 continues, at 1606, and a group of models stored in a data structure are evaluated. The evaluation can be based on a current environment within the communications network and respective parameters of models of the group of models. A determination is made, at 1608, whether an existing model is available. For example, to determine whether an existing model is available models in the group of models are evaluated to determine if any of the available models satisfy the defined reliability level and are determined to be suitable for reuse in the communications network. If it is determined at 1608 that an existing model is available ("YES"), at 1610, the available model is selected, resulting in a selected existing model.

According to some implementations, evaluating the group of models can include cross-referencing models in the data structure with live data occurring within the communications network. Further to these implementations, selecting the existing model can include selecting the existing model based on data of the existing model being determined to match the live data.

Further, at 1612, the selected existing model is deployed within the communications network. The deploying can include incrementally transitioning facilitation of the management of resources from the second model to the third model.

Alternatively, if it is determined, at 1608, that an existing model is not suitable for reuse in the communications network ("NO"), at 1614, the computer-implemented method 1600 retrains the first model (or another model, including an existing model or a new model) on a set of current network data associated with the communications network. The first model can be retrained to facilitate the management of the resources to a defined confidence level.

Figure 17:
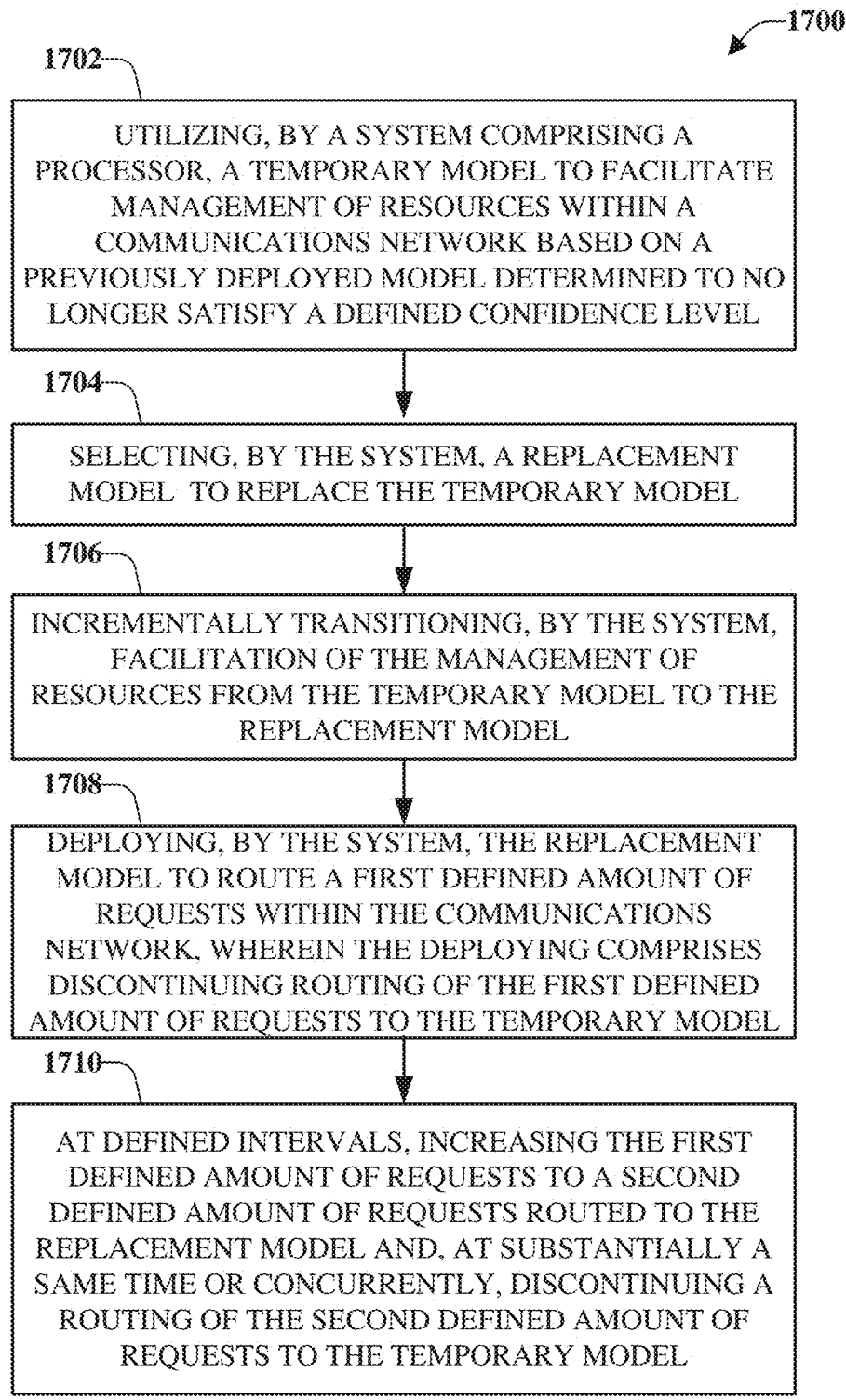
FIG. 17 illustrates another flow diagram of an example, non-limiting, computer-implemented method for incrementally transitioning facilitation of management of resources from a model that temporarily facilitates management of the resources within the communications network in accordance with one or more embodiments described herein.

FIG. 17 illustrates another flow diagram of an example, non-limiting, computer-implemented method 1700 for incrementally transitioning facilitation of management of resources from a model that temporarily facilitates management of the resources within the communications network in accordance with one or more embodiments described herein. The computer-implemented method 1700 and/or other methods discussed herein can be implemented by a system comprising a processor and a memory. In an example, the system can be implemented by a network equipment of a disaggregated network architecture. It is noted that the embodiment of FIG. 17 is discussed with respect to being deployed within an O-RAN framework, however, the disclosed embodiments are not limited to an O-RAN framework.

At 1702, a temporary model is utilized to facilitate management of resources within a communications network based on a previously deployed model determined to no longer satisfy a defined confidence level. At 1704, a replacement model is selected to replace the temporary model. The replacement model can be the previously deployed model, which has been retrained. Alternatively, the replacement model can be a model selected from a group of models that is determined to be suitable for reuse in the communications network.

At 1706, the computer-implemented method 1700 incrementally transitions facilitation of the management of resources from the temporary model to the replacement model. Thus, at 1708, the replacement model is deployed to route a first defined amount of requests within the communications network. Deployment of the replacement model includes discontinuing routing of the first defined amount of requests to the second model. Further, at 1710, the computer-implemented method 1700, at defined intervals, increases the first defined amount of requests to a second defined amount of requests routed to the replacement model and, at substantially a same time or concurrently, discontinues a routing of the second defined amount of requests to the temporary model.

Figure 18:
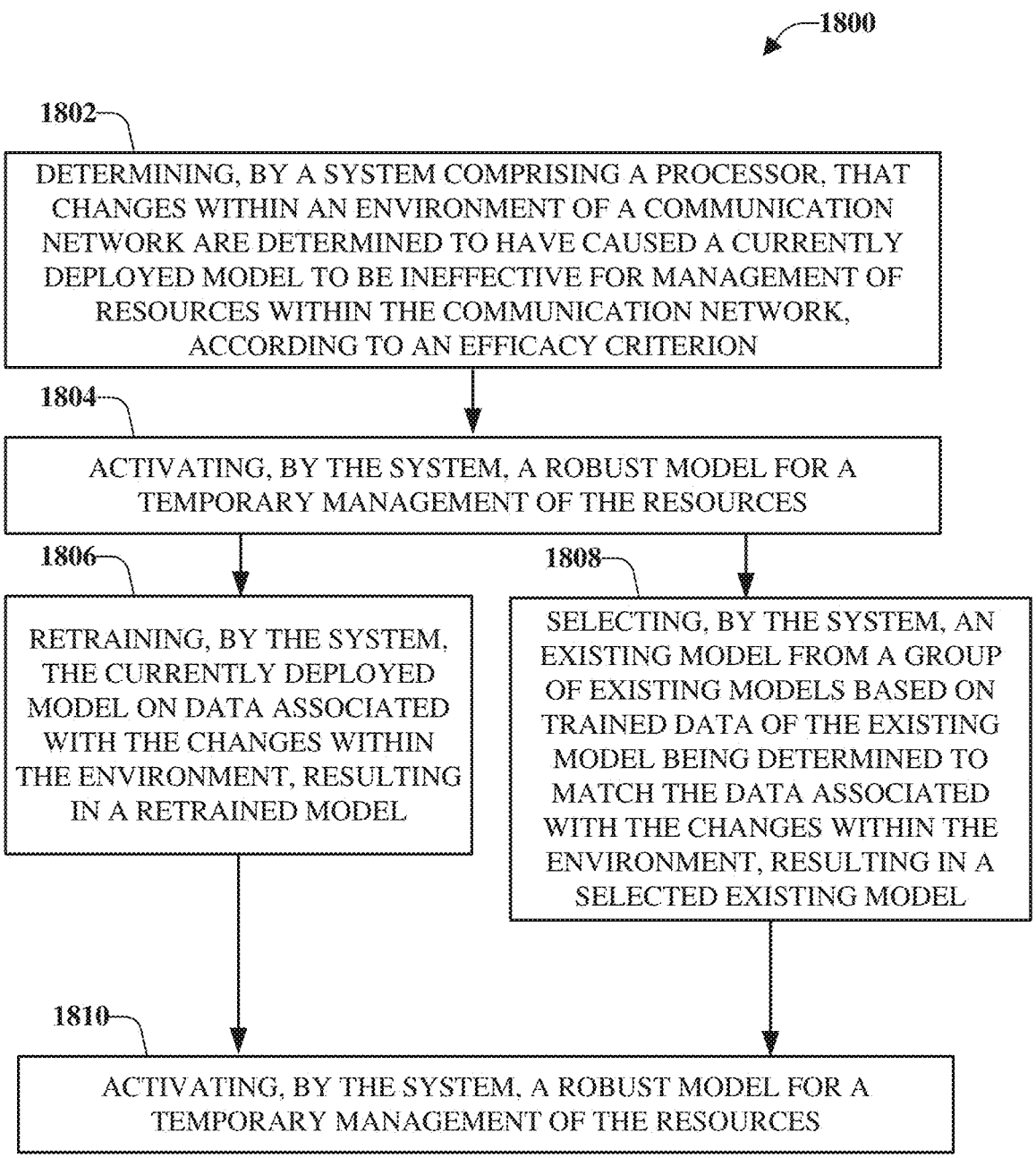
FIG. 18 illustrates another flow diagram of an example, non-limiting, computer-implemented method that facilitates intelligent concept drift mitigation in advanced communication networks in accordance with one or more embodiments described herein.

FIG. 18 illustrates another flow diagram of an example, non-limiting, computer-implemented method 1800 that facilitates intelligent concept drift mitigation in advanced communication networks in accordance with one or more embodiments described herein. The computer-implemented method 1800 and/or other methods discussed herein can be implemented by a system comprising a processor and a memory. In an example, the system can be implemented by a network equipment of a disaggregated network architecture. It is noted that the embodiment of FIG. 18 is discussed with respect to being deployed within an O-RAN framework, however, the disclosed embodiments are not limited to an O-RAN framework.

At 1802, a determination is made that changes within an environment of a communication network are determined to have caused a currently deployed model to be ineffective for management of resources within the communication network, according to an efficacy criterion. Based on the determination, at 1804, a robust model is activated for a temporary management of the resources. Activation of the robust model can include routing requests within the communication network to the robust model, and wherein the robust model facilitates management of the requests.

According to some implementations, activation of the robust model can include routing requests within the communication network to the robust model. In addition, the computer-implemented method 1800 can control a speed at which a percentage of requests are transitioned from the robust model to the retrained model or the selected existing model. Further to this implementation, controlling the speed can include configuring a total data size for routing of requests to the retrained model or the selected existing model during the retraining or the selecting.

Upon or after the activation of the robust model, the computer-implemented method 1800 can continue, at 1806, with retraining the currently deployed model on data associated with the changes within the environment, resulting in a retrained model. Alternatively, at 1808, the computer-implemented method 1800 can select an existing model from a group of existing models based on trained data of the existing model being determined to match the data associated with the changes within the environment, resulting in a selected existing model.

In some implementations, the currently deployed model and the selected existing model are tree-based models, and the robust model is a neural network model. According to some implementations, the currently deployed model and the selected existing model are linear models, and the robust model is a neural network model.

Further, at 1810, the computer-implemented method 1800 can transition a management of the resources from the robust model to the retrained model or to the selected existing model. The transition can include, at substantially a first time, discontinuing use of the robust model for a first defined percentage of the requests and implementing use of the retrained model or the selected existing model for the first defined percentage of the requests. Further, after a defined time interval and at substantially a second time after the first time, the computer-implemented method 1800 can discontinue use of the robust model for a second defined percentage of requests and implement use of the retrained model or the selected existing model for the second defined percentage of requests.

As discussed herein, provided are systems, methods, and other embodiments for intelligent concept drift mitigation in advanced communication networks. Several embodiments have been provided to outline the ways in which the embodiments can be employed in the network design. Provided are AI and/or ML techniques that will be deployed and mapped to different network entities of the O-RAN framework within which they will be hosted along with the flow of data and requisite signaling for algorithmic learning, and policy executions. The disclosed embodiments provide a unique approach for simultaneous AI and/or ML applications (dApp, xApp, and rApp) deployment at O-RAN Control Unit (O-CU), near real-time RIC radio intelligent controller (near-RT RIC) and non-real-time radio intelligent controller (non-RT RIC) respectively, to enable fast decisions and cooperation between cells within a cell cluster. A data driven reinforcement learning approach for online learning and real-time policy execution can be employed. To improve the model performance, a combination of federated learning, transfer learning, and intent based reinforcement learning approaches can be utilized to yield better results and faster convergence.

Example, non-limiting Non-Real Time RAN Intelligent Controller (Non-RT RIC) functions include service and policy management, RAN analytics, and model training for the near-Real Time RICs. In this regard, the Non-RT-RIC enables non-real-time (e.g., a first range of time, such as >1 second) control of RAN elements and their resources through applications, e.g., specialized applications called rApps. Example, non-limiting Near-Real Time RAN Intelligent Controller (Near-RT RIC) functions enable near-real-time optimization and control and data monitoring of O-CU and O-DU nodes in near-RT timescales (e.g., a second range of time representing less time than the first time range, such as between 10 milliseconds and 1 second). In this regard, the Near-RT RIC controls RAN elements and their resources with optimization actions that typically take about 10 milliseconds to about one second to complete, although different time ranges can be selected. The Near-RT RIC can receive policy guidance from the Non-RT-RIC and can provide policy feedback to the Non-RT-RIC through specialized applications called xApps. In this regard, a Real Time RAN Intelligent Controller (RT RIC) is designed to handle network functions at real time timescales (e.g., a third range of time representing less time than the first time range and the second time range, such as <10 milliseconds).

Methods that can be implemented in accordance with the disclosed subject matter will be better appreciated with reference to the flow charts provided herein. While, for purposes of simplicity of explanation, the methods are shown and described as a series of flows and/or blocks, it is to be understood and appreciated that the disclosed example embodiments are not limited by the number or order of flows and/or blocks, as some flows and/or blocks can occur in different orders and/or at substantially the same time with other blocks from what is depicted and described herein. Moreover, not all illustrated flows and/or blocks are required to implement the disclosed methods. It is to be appreciated that the functionality associated with the flows and/or blocks can be implemented by software, hardware, a combination thereof, or any other suitable means (e.g., device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

Example embodiments of systems, devices, apparatuses, and/or processes explained in this disclosure can constitute machine-executable component(s) embodied within machine(s) (e.g., embodied in one or more computer readable mediums (or media) associated with one or more machines). Such component(s), when executed by the one or more machines (e.g., computer(s), computing device(s), virtual machine(s), and so on) can cause the machine(s) to perform the operations described.

In various embodiments, the system can be any type of component, machine, device, facility, apparatus, and/or instrument that comprises a processor and/or can be capable of effective and/or operative communication with a wired and/or wireless network. Components, machines, apparatuses, devices, facilities, and/or instrumentalities that can comprise the system can include tablet computing devices, handheld devices, server class computing machines and/or databases, laptop computers, notebook computers, desktop computers, cell phones, smart phones, consumer appliances and/or instrumentation, industrial and/or commercial devices, hand-held devices, digital assistants, multimedia Internet enabled phones, multimedia players, and the like.

As used herein, the term "storage device," "first storage device," "second storage device," "storage cluster nodes," "storage system," and the like (e.g., node device), can include, for example, private or public cloud computing systems for storing data as well as systems for storing data comprising virtual infrastructure and those not comprising virtual infrastructure. The term "I/O request" (or simply "I/O") can refer to a request to read and/or write data.

The term "cloud" as used herein can refer to a cluster of nodes (e.g., set of network servers), for example, within an object storage system, which are communicatively and/or operatively coupled to one another, and that host a set of applications utilized for servicing user requests. In general, the cloud computing resources can communicate with user devices via most any wired and/or wireless communication network to provide access to services that are based in the cloud and not stored locally (e.g., on the user device). A typical cloud-computing environment can include multiple layers, aggregated together, that interact with one another to provide resources for end-users.

Further, the term "storage device" can refer to any Non-Volatile Memory (NVM) device, including Hard Disk Drives (HDDs), flash devices (e.g., NAND flash devices), and next generation NVM devices, any of which can be accessed locally and/or remotely (e.g., via a Storage Attached Network (SAN)). In some embodiments, the term "storage device" can also refer to a storage array comprising one or more storage devices. In various embodiments, the term "object" refers to an arbitrary-sized collection of user data that can be stored across one or more storage devices and accessed using I/O requests.

Further, a storage cluster can include one or more storage devices. For example, a storage system can include one or more clients in communication with a storage cluster via a network. The network can include various types of communication networks or combinations thereof including, but not limited to, networks using protocols such as Ethernet, Internet Small Computer System Interface (iSCSI), Fibre Channel (FC), and/or wireless protocols. The clients can include user applications, application servers, data management tools, and/or testing systems.

As utilized herein an "entity," "client," "user," and/or "application" can refer to any system or person that can send I/O requests to a storage system. For example, an entity, can be one or more computers, the Internet, one or more systems, one or more commercial enterprises, one or more computers, one or more computer programs, one or more machines, machinery, one or more actors, one or more users, one or more customers, one or more humans, and so forth, hereinafter referred to as an entity or entities depending on the context.

Figure 19:
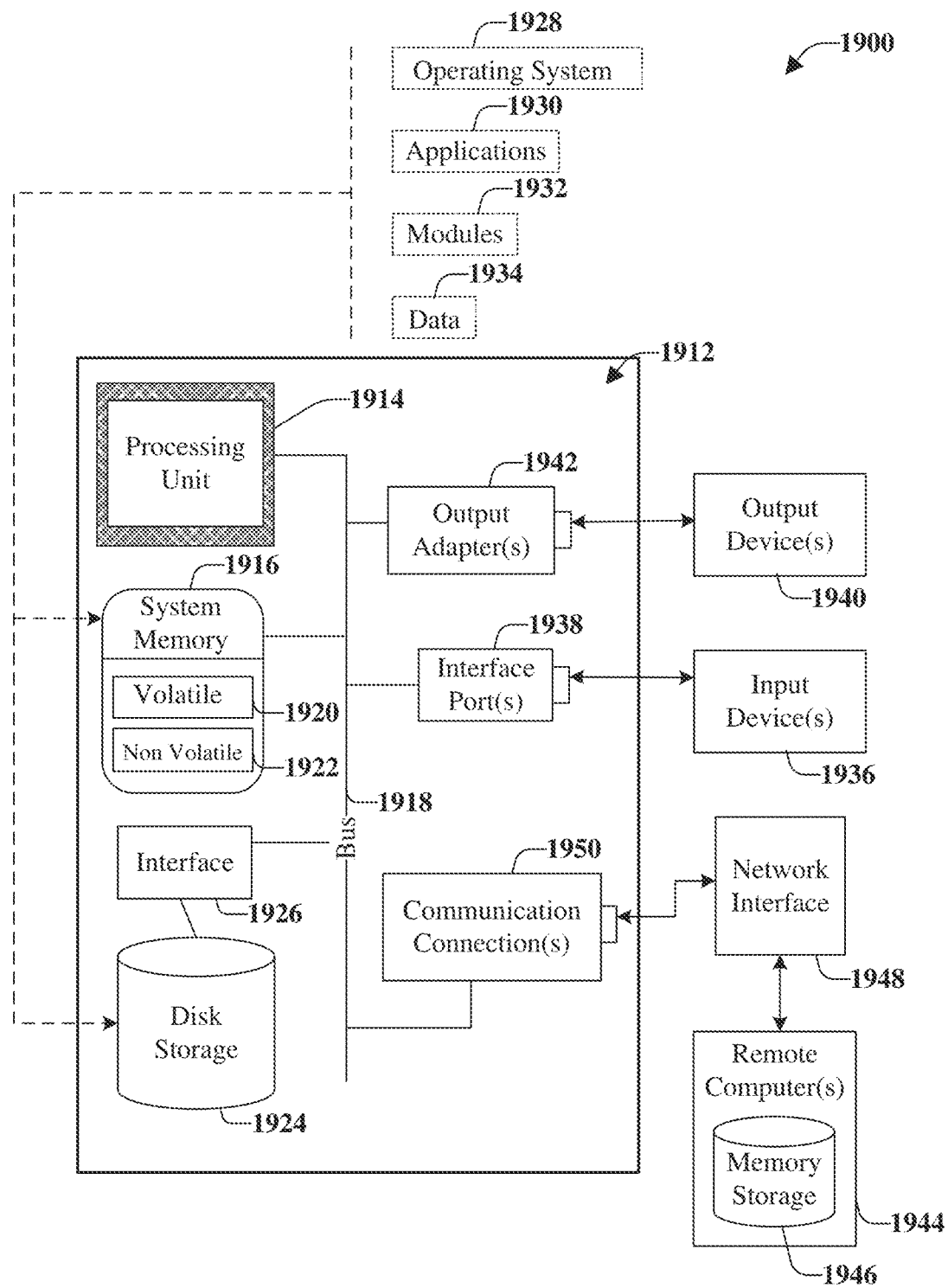
FIG. 19 illustrates an example, non-limiting, computing environment in which one or more embodiments described herein can be facilitated.

In order to provide a context for the various example embodiments of the disclosed subject matter, FIG. 19 as well as the following discussion are intended to provide a brief, general description of a suitable environment in which the various example embodiments of the disclosed subject matter can be implemented.

With reference to FIG. 19, an example environment 1910 for implementing various example embodiments of the aforementioned subject matter comprises a computer 1912. The computer 1912 comprises a processing unit 1914, a system memory 1916, and a system bus 1918. The system bus 1918 couples system components including, but not limited to, the system memory 1916 to the processing unit 1914. The processing unit 1914 can be any of various available processors. Multi-core microprocessors and other multiprocessor architectures also can be employed as the processing unit 1914.

The system bus 1918 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1916 comprises volatile memory 1920 and nonvolatile memory 1922. The basic input/output system (BIOS), containing the basic routines to transfer information between elements within the computer 1912, such as during start-up, is stored in nonvolatile memory 1922. By way of illustration, and not limitation, nonvolatile memory 1922 can comprise read only memory (ROM), programmable ROM (PROM), electrically programmable ROM (EPROM), electrically erasable PROM (EEPROM), or flash memory. Volatile memory 1920 comprises random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1912 also comprises removable/non-removable, volatile/non-volatile computer storage media. FIG. 19 illustrates, for example, a disk storage 1924. Disk storage 1924 comprises, but is not limited to, devices like a magnetic disk drive, floppy disk drive, tape drive, Jaz drive, Zip drive, LS-100 drive, flash memory card, or memory stick. In addition, disk storage 1924 can comprise storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1924 to the system bus 1918, a removable or non-removable interface is typically used such as interface 1926.

It is to be appreciated that FIG. 19 describes software that acts as an intermediary between users and the basic computer resources described in suitable operating environment 1910. Such software comprises an operating system 1928. Operating system 1928, which can be stored on disk storage 1924, acts to control and allocate resources of the computer 1912. System applications 1930 take advantage of the management of resources by operating system 1928 through program modules 1932 and program data 1934 stored either in system memory 1916 or on disk storage 1924. It is to be appreciated that one or more embodiments of the subject disclosure can be implemented with various operating systems or combinations of operating systems.

A user enters commands or information into the computer 1912 through input device(s) 1936. Input devices 1936 comprise, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1914 through the system bus 1918 via interface port(s) 1938. Interface port(s) 1938 comprise, for example, a serial port, a parallel port, a game port, and a universal serial bus (USB). Output device(s) 1940 use some of the same type of ports as input device(s) 1936. Thus, for example, a USB port can be used to provide input to computer 1912, and to output information from computer 1912 to an output device 1940. Output adapters 1942 are provided to illustrate that there are some output devices 1940 like monitors, speakers, and printers, among other output devices 1940, which can utilize special adapters. The output adapters 1942 comprise, by way of illustration and not limitation, video and sound cards that provide a means of connection between the output device 1940 and the system bus 1918. It should be noted that other devices and/or systems of devices provide both input and output capabilities such as remote computer(s) 1944.

Computer 1912 can operate in a networked environment using logical connections to one or more remote computers, such as remote computer(s) 1944. The remote computer(s) 1944 can be a personal computer, a server, a router, a network PC, a workstation, a microprocessor based appliance, a peer device or other common network node and the like, and typically comprises many or all of the elements described relative to computer 1912. For purposes of brevity, only a memory storage device 1946 is illustrated with remote computer(s) 1944. Remote computer(s) 1944 is logically connected to computer 1912 through a network interface 1948 and then physically connected via communication connection 1950. Network interface 1948 encompasses communication networks such as local-area networks (LAN) and wide-area networks (WAN). LAN technologies comprise Fiber Distributed Data Interface (FDDI), Copper Distributed Data Interface (CDDI), Ethernet/IEEE 802.3, Token Ring/IEEE 802.5, and the like. WAN technologies comprise, but are not limited to, point-to-point links, circuit switching networks like Integrated Services Digital Networks (ISDN) and variations thereon, packet switching networks, and Digital Subscriber Lines (DSL).

Communication connection(s) 1950 refers to the hardware/software employed to connect the network interface 1948 to the system bus 1918. While communication connection 1950 is shown for illustrative clarity inside computer 1912, it can also be external to computer 1912. The hardware/software necessary for connection to the network interface 1948 comprises, for exemplary purposes only, internal, and external technologies such as, modems including regular telephone grade modems, cable modems and DSL modems, ISDN adapters, and Ethernet cards.

Figure 20:
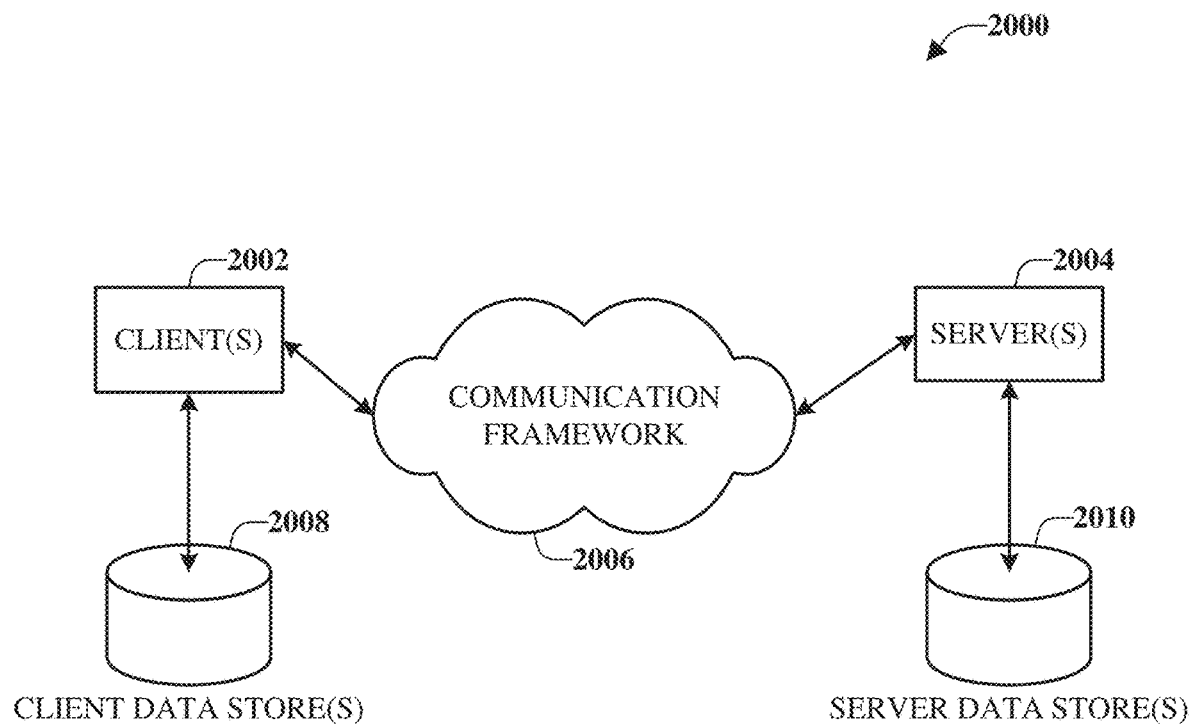
FIG. 20 illustrates an example, non-limiting, networking environment in which one or more embodiments described herein can be facilitated.

FIG. 20 is a schematic block diagram of a sample computing environment 2000 with which the disclosed subject matter can interact. The sample computing environment 2000 includes one or more client(s) 2002. The client(s) 2002 can be hardware and/or software (e.g., threads, processes, computing devices). The sample computing environment 2000 also includes one or more server(s) 2004. The server(s) 2004 can also be hardware and/or software (e.g., threads, processes, computing devices). The servers 2004 can house threads to perform transformations by employing one or more embodiments as described herein, for example. One possible communication between a client 2002 and servers 2004 can be in the form of a data packet adapted to be transmitted between two or more computer processes. The sample computing environment 2000 includes a communication framework 2006 that can be employed to facilitate communications between the client(s) 2002 and the server(s) 2004. The client(s) 2002 are operably connected to one or more client data store(s) 2008 that can be employed to store information local to the client(s) 2002. Similarly, the server(s) 2004 are operably connected to one or more server data store(s) 2010 that can be employed to store information local to the servers 2004.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," "manager," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. Yet another example, a component can be an apparatus that provides specific functionality through electronic components without mechanical parts, the electronic components can comprise a processor therein to execute software or firmware that confer(s) at least in part the functionality of the electronic components. In an example embodiment, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable storage media can comprise, but are not limited to, radon access memory (RAM), read only memory (ROM), electrically erasable programmable read only memory (EEPROM), flash memory or other memory technology, solid state drive (SSD) or other solid-state storage technology, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments.

Disclosed embodiments and/or aspects should neither be presumed to be exclusive of other disclosed embodiments and/or aspects, nor should a device and/or structure be presumed to be exclusive to its depicted element in an example embodiment or embodiments of this disclosure, unless where clear from context to the contrary. The scope of the disclosure is generally intended to encompass modifications of depicted embodiments with additions from other depicted embodiments, where suitable, interoperability among or between depicted embodiments, where suitable, as well as addition of a component(s) from one embodiment(s) within another or subtraction of a component(s) from any depicted embodiment, where suitable, aggregation of elements (or embodiments) into a single device achieving aggregate functionality, where suitable, or distribution of functionality of a single device into multiple device, where suitable. In addition, incorporation, combination or modification of devices or elements (e.g., components) depicted herein or modified as stated above with devices, structures, or subsets thereof not explicitly depicted herein but known in the art or made evident to one with ordinary skill in the art through the context disclosed herein are also considered within the scope of the present disclosure.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGS., where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   utilizing, by a system comprising a processor, a first model that facilitates management of resources within a communications network, wherein a reliability level of the first model is determined to satisfy a defined reliability level;
   based on a first determination that the reliability level of the first model no longer satisfies the defined reliability level, selecting, by the system, a second model from a group of existing models based on trained data of the second model being determined to match a current situation of the communications network,
   replacing, by the system, the first model with the second model that temporarily facilitates management of the resources within the communications network; and
   based on a second determination that a third model satisfies the defined reliability level, deploying, by the system, the third model within the communications network, wherein the deploying comprises incrementally transitioning facilitation of the management of resources from the second model to the third model.

2. The method of claim 1, further comprising:
   prior to the replacing, determining, by the system, that a network environment or a network deployment has changed; and
   evaluating, by the system, the reliability level of the first model based on the network environment or the network deployment.

3. The method of claim 1, wherein the incrementally transitioning comprises:
   deploying the third model to route a first defined amount of requests within the communications network, wherein the deploying comprises discontinuing routing of the first defined amount of requests to the second model; and
   at defined intervals, increasing the first defined amount of requests to a second defined amount of requests routed to the third model and, at a same time or concurrently, discontinuing a routing of the second defined amount of requests to the second model.

4. The method of claim 3, further comprising:
   during the deploying or the increasing and based on detecting that the third model fails to satisfy the defined reliability level, resuming, by the system, routing of requests to the second model; and discontinuing, by the system, use of the third model, wherein the resuming and the discontinuing occur at about a same time or concurrently.

5. The method of claim 1, further comprising:
prior to the deploying, retraining, by the system, the first model on a set of current network data associated with the communications network, wherein the first model is retrained to facilitate the management of the resources to a defined confidence level.

6. The method of claim 1, further comprising:
prior to the deploying, evaluating, by the system, a group of models stored in a data structure, wherein the evaluating is based on a current environment within the communications network and respective parameters of models of the group of models; and
selecting, by the system, the third model from the group of models based on the third model being determined to satisfy the defined reliability level and determined to be suitable for reuse in the communications network.

7. The method of claim 6, wherein the evaluating comprises cross-referencing models in the data structure with live data occurring within the communications network, and wherein the selecting comprises selecting the third model based on data of the third model being determined to match the live data.

8. The method of claim 1, wherein the first model is a tree-based model, and wherein the second model is a neural network model.

9. The method of claim 1, wherein the first model is a linear model, and wherein the second model is a neural network model.

10. A system, comprising:
a processor; and
a memory that stores executable instructions that, when executed by the processor, facilitate performance of operations, comprising:
based on changes within an environment of a communication network determined to have caused a currently deployed model to be ineffective for management of resources within the communication network, according to an efficacy criterion:
activating a robust model for a temporary management of the resources;
selecting an existing model from a group of existing models based on trained data of the existing model being determined to match the data associated with the changes within the environment, resulting in a selected existing model; and
transitioning a management of the resources from the robust model to the selected existing model.

11. The system of claim 10, wherein the activating comprises routing requests within the communication network to the robust model, and wherein the robust model facilitates management of the requests.

12. The system of claim 10, wherein the transitioning comprises:
at a first time:
discontinuing use of the robust model for a first defined percentage of the requests, and
implementing use of the selected existing model for the first defined percentage of the requests; and
after a defined time interval and at a second time after the first time:
discontinuing use of the robust model for a second defined percentage of requests, and
implementing use of the selected existing model for the second defined percentage of requests.

13. The system of claim 10, wherein the activating comprises routing requests within the communication network to the robust model, and wherein the operations further comprise:
controlling a speed at which a percentage of requests are transitioned from the robust model to the selected existing model.

14. The system of claim 13, wherein the controlling comprises:
configuring a total data size for routing of requests the selected existing model during the selecting.

15. The system of claim 10, wherein the currently deployed model and the selected existing model are tree-based models, and wherein the robust model is a neural network model.

16. The system of claim 10, wherein the currently deployed model and the selected existing model are linear models, and wherein the robust model is a neural network model.

17. The system of claim 10, wherein the system is deployed in a disaggregated architecture of network equipment.

18. A non-transitory machine-readable medium, comprising executable instructions that, when executed by a processor of network equipment, facilitate performance of operations, comprising:
utilizing a first model to route requests within a communications network, wherein a reliability level of the first model is determined to satisfy a defined reliability level;
based on a first determination that the reliability level of the first model no longer satisfies the defined reliability level, selecting a second model from a group of existing models based on trained data of the second model being determined to match a current situation of the communications network;
replacing the first model with the second model that temporarily facilitates routing of the requests within the communications network; and
based on a second determination that a third model satisfies the defined reliability level, deploying the third model within the communications network, wherein the deploying comprises incrementally transitioning routing of the requests from the second model to the third model.

19. The non-transitory machine-readable medium of claim 18, wherein the deploying comprises:
at a same time:
rerouting a first percentage of requests from the second model to the third model; and
after a defined period of time, increasing the first percentage of requests to a second percentage of requests being rerouted from the second model to the third model until all requests have been rerouted to the third model.

20. The non-transitory machine-readable medium of claim 19, wherein a speed of the rerouting from the second model to the third model is configured, during a model evaluation phase, as a total data size for the routing to the third model.

\* \* \* \* \*